United States Patent [19]

Shirasawa et al.

[11] Patent Number: 5,689,590
[45] Date of Patent: Nov. 18, 1997

[54] BACKGROUND NOISE REMOVING APPARATUS AND METHOD APPLICABLE TO COLOR IMAGE PROCESSING APPARATUS

[75] Inventors: Hisao Shirasawa; Kaoru Imao, both of Yokohama, Japan

[73] Assignee: Ricoh Company, Ltd., Tokyo, Japan

[21] Appl. No.: 445,288

[22] Filed: May 19, 1995

Related U.S. Application Data

[63] Continuation of Ser. No. 52,918, Apr. 27, 1993, abandoned.

[30] Foreign Application Priority Data

| Apr. 30, 1992 | [JP] | Japan | 4-110566 |
| Oct. 28, 1992 | [JP] | Japan | 4-289787 |
| Mar. 8, 1993 | [JP] | Japan | 5-045604 |

[51] Int. Cl.$^6$ .................................................. G06K 9/40
[52] U.S. Cl. ................... 382/254; 382/162; 382/274; 358/518
[58] Field of Search ..................... 382/254, 274, 382/273, 162, 167, 163, 270; 358/518, 519, 520, 523, 443

[56] References Cited

U.S. PATENT DOCUMENTS

| 4,302,672 | 11/1981 | Kato et al. | 382/6 |
| 4,314,274 | 2/1982 | Atoji et al. | 358/80 |
| 4,335,399 | 6/1982 | Matsumoto | 358/80 |
| 4,733,295 | 3/1988 | Hemsky et al. | 358/22 |
| 4,929,978 | 5/1990 | Kanamori et al. | 355/38 |
| 4,963,978 | 10/1990 | Ueda et al. | 358/29 |
| 4,977,448 | 12/1990 | Murata et al. | 358/75 |
| 5,057,919 | 10/1991 | de Haan et al. | 358/136 |
| 5,068,909 | 11/1991 | Rutherford et al. | 382/49 |
| 5,155,588 | 10/1992 | Levien | 358/80 |
| 5,159,470 | 10/1992 | Ishida et al. | 358/457 |

FOREIGN PATENT DOCUMENTS

| 3-28110 | 4/1991 | Japan . |
| 4-2269 | 7/1992 | Japan . |

*Primary Examiner*—Yon J. Couso
*Attorney, Agent, or Firm*—Woodcock Washburn Kurtz Mackiewicz & Norris

[57] ABSTRACT

A density converting unit converts densities concerning respective color components in color-image data for each pixel so as to change the densities concerning respective color components for the pixel into lower densities when the densities concerning respective color components for the pixel are determined to be white or approximately white. The density converting unit converts the densities concerning color components in the color-image data for each pixel so as to change the densities concerning respective color components for the pixel into densities corresponding to white ones when all of the densities concerning respective color components for the pixel are lower than a predetermined threshold density value.

33 Claims, 25 Drawing Sheets

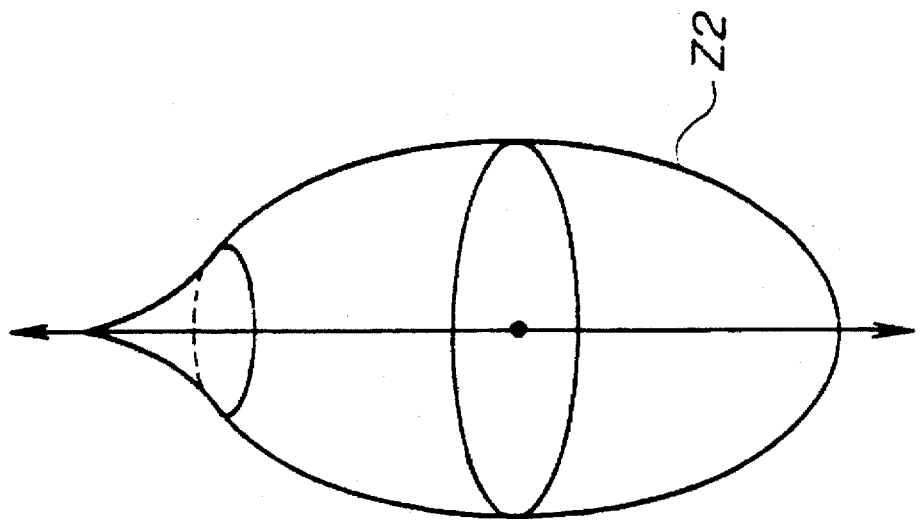
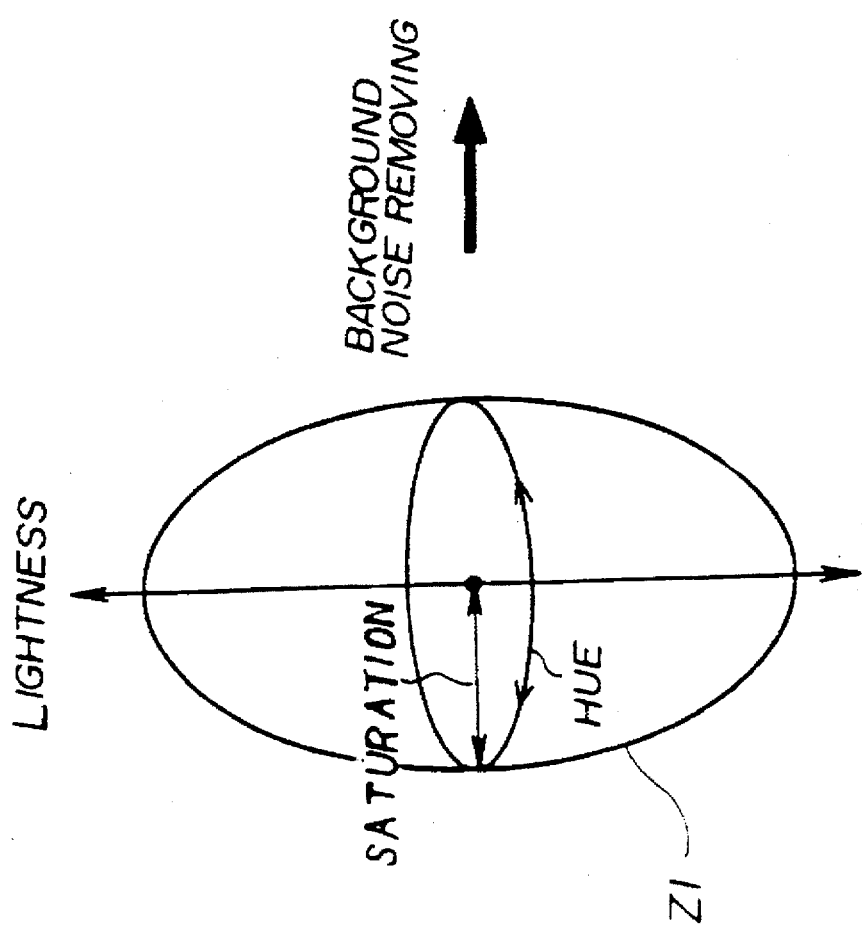

AFTER EXPANSION

BEFORE EXPANSION

☐ PIXEL DETERMINED AS BACKGROUND
▨ PIXEL DETERMINED AS NON-BACKGROUND
▩ PIXEL DETERMINED AS NON-BACKGROUND AS A RESULT OF EXPANSION

BACKGROUND NOISE REMOVING APPARATUS AND METHOD APPLICABLE TO COLOR IMAGE PROCESSING APPARATUS

This is a continuation of U.S. patent application Ser. No. 08/052,918, filed Apr. 27,1993, now abandoned.

BACKGROUND OF THE INVENTION

The present invention relates to a background noise removing apparatus and method applicable to a color image processing apparatus.

The term "density" or "density level" used hereinafter is defined to be as follows: the "density" D of an object is obtained by the following equation: $D=\log_{10}(R)$, where R represents "reflectance" of the object; R=Rr/Ra, where Rr represents "reflected light quantity" of the object and Ra represents "applied light quantity" of the object; the "reflected light quantity" of the object comprising a quantity of light reflected by the object as a result of a light corresponding to the above "applied light quantity" being applied to the object. Further, the term "reflectance" defined above will also be used hereinafter.

The term "background noise" will now be explained. There may be a case where, for example, an original color image made on a sheet of paper is to be duplicated by means of a color image duplicator so as to obtain other sheets of paper on which duplicated images are printed. This duplication may be performed such that the original image on the sheet of paper is read by means of a scanner, and multi-value image data obtained by the reading is then output by means of a display screen (CRT) or is output by means of a printer. In this case, a conventional duplicator may duplicate "Background noise", that is, it may duplicate stains or densities appearing on the sheet of paper, other than the original image. These stains or densities may thus occur on the sheet of paper of the original image and in the duplicate of the original image. Such stains may occur as a result of, for example, ink forming the original image being rubbed accidentally so that the ink is smeared on the sheet of paper undesirably. In another example, such stains may occur when the sheet of paper having the original image was made by duplicating another source image, the duplication causing the stains due to the duplicating characteristics of the used duplicator. In another example, such stains may have occurred on the sheet of paper used for making the original image thereon, for example, in the process of manufacturing the sheet of paper.

A countermeasure may be taken so as to prevent duplication of such undesirable stains or densities appearing on the sheet of paper having the original image. An example of such a countermeasure comprises performing gamma conversion on each color component, independently, among the red component, the green component, and the blue component (or among the yellow component, the magenta component, and the cyan component) of each pixel among pixels comprising a picture area of the original image. Hereinafter, the abbreviations "R", "G", "B", "Y", "M", "C", and "K" will be used instead of the term "red component", "green component", "blue component", "green component", "yellow component", "magenta component", "cyan component", and "black component", respectively. The gamma conversion comprises conversion of density levels of the image data for each pixel, in which conversion, as shown in FIG. 1, an output density level is made to be 0 when a corresponding input density level is equal to or less than a value D1, and an output density level is made to be one of 0-255 when the corresponding input density level is D1-255.

Such technology as mentioned above is disclosed in, for example, Japanese Patent Publication No.3-28110 and Japanese Patent Laid-Open Application No.4-2269.

However, in the method according to the above mentioned technology, the gamma conversion may cause undesirable hue change between the original image and the duplicated image during the duplication process, the hue change occurring at portions in the picture area of the original image, in which portions the image has low lightness in comparison to the lightness of highlight or white background portions. The conversion process in the technology for background noise removing is not intended to cause such hue change at such portions having relatively dark lightness, but rather is intended to remove stains or densities other than the original image to be duplicated. An example of such undesirable lightness change will now described. After gamma conversion has been performed, with D1=20, on color image data in which the color (R, G, B)=(20, 20, 200) is found, the converted color image data includes the color (R, G, B)=(0, 0, 195). "0" of each color component (color components comprising R, G and B, or Y, M and C, or Y, M, C and K, hereinafter) means a condition in which the light associated with each color component is applied at 100% of the light application range and "255" of each color component means a condition in which the light associated with the color component is applied in 0% in the light application range. In an RGB system which has linearity to densities, the color (R, G, B)=(255, 0, 0) corresponds to cyan, the color (R, G, B)=(0, 255, 0) corresponds to magenta and the color (R, G, B)=(0, 0, 255) corresponds to yellow.) By this conversion, hue changes occur such that, for example, the yellow density becomes a little stronger in the hue of the image data, the change resulting from the conversion process.

Characteristics in which data values vary linearly with respect to variation of corresponding densities will be called "density linear characteristics" hereinafter. In the case where r,g and b comprise color components of image data in density linear characteristics, identity of density ratios of different colors among the corresponding respective color components r, g and b of image data may not always result in identity, between the colors, of the corresponding respective hues, for example, in the duplicated image. Even though, for practical use, it may be considered that the former identity results in the latter identity because most of human eyes cannot distinguish the difference between the different colors which have the same density ratios. On the other hand, characteristics in which data values vary linearity with respect to variation of the corresponding reflectance will be called "reflectance linear characteristics" hereinafter. Where r, g and b comprise color components of image data in reflectance linear characteristics, identity, between different colors, of density ratios among the corresponding respective color components r, g and b of image data may always result in identity, between the colors, of corresponding the respective hues.

Furthermore, there may be a case where a background noise removing process converts relatively high density-levels portions into the white density level. Such a background noise removing process may be effective for sufficiently removing from a sheet of paper undesirable stains or densities other than an original image to be duplicated. However, in this case, characters (letters) duplicated from such an original image may become difficult to read; this phenomenon occurs because lines in a character image having a relatively weak contrast may be duplicated as thin lines in the duplication process having the above mentioned conversion step (for example, the gamma conversion).

SUMMARY OF THE INVENTION

An object of the present invention is to provide a background noise removing apparatus and method allowing hue change to be controlled as well allowing removal of undesirable stains or densities other than an image to be duplicated.

To achieve the above object, a background noise removing apparatus comprises density converting means for converting densities associated with respective color components in color image data for each pixel so as to change the densities concerning respective color components for each pixel into lower densities when the densities concerning respective color components for the pixel comprise white or approximately white portions of the color image. In the above background noise removing apparatus, the density converting means may convert the densities associated with color components in the color image data for each pixel so as to change the densities associated with respective color components for each pixel into a density associated with white pixels when all of the densities associated with respective color components for the pixel ape lower than a predetermined threshold density value. In the above background noise removing apparatus, the density converting means may convert densities of color image data so as to change the densities into a lower density in manners determined by using the original densities, the densities of the color image data to be converted comprising data of a white or approximately white image portion of the color image, for example, to be duplicated. The above background noise removing apparatus may further comprise color space converting means for converting the image data in a first color space into data in a second color space, the first color space being based on a red density axis, a green density axis and a blue density axis and said second color space being based on a lightness axis, a saturation axis and a hue axis, and wherein the density converting means executes the corresponding conversion process, in manners determined by using the lightness and saturation of the color image data, after the image data has been converted into data of the second color space. Hereinafter, the term "color space" means a space comprising points each having a position representing a set of color component values defining a color. For example, in a color space based on R, G and B axes, the three axes respectively corresponding to coordinate axes, the position of each point in the space is associated with coordinates on the coordinate axes. Respective coordinate values indicate respective color components R, G and B.

By the above constitution, the density conversion for background noise removal is performed in manners determined by using the original density levels or in manners determined by using the lightness and saturation of the color image, thus a hue change of a picture portion, which hue change may occur during the duplication process, may be almost completely prevented. Further, the color space conversion may enable the background noise removing by means of a process to be more simple than in the related art.

Other objects and further features of the present invention will become more apparent from the following detailed description when read in conjunction with the accompanying drawings.

BRIEF DESCRIPTION OF THE DRAWING

FIGS. 6A and 6B respectively show color representing zones in color spaces, which zones correspond to color image data, FIG.6A representing a zone corresponding to the color image data which has not performed the background noise removing process yet, and FIG.6B representing a zone corresponding to the color image which has already performed the background noise removing process, according to the first embodiment of the present invention, during which process the top portion of the color representation zone is extended upward;

DESCRIPTION OF THE PREFERRED EMBODIMENTS

Figure 1:
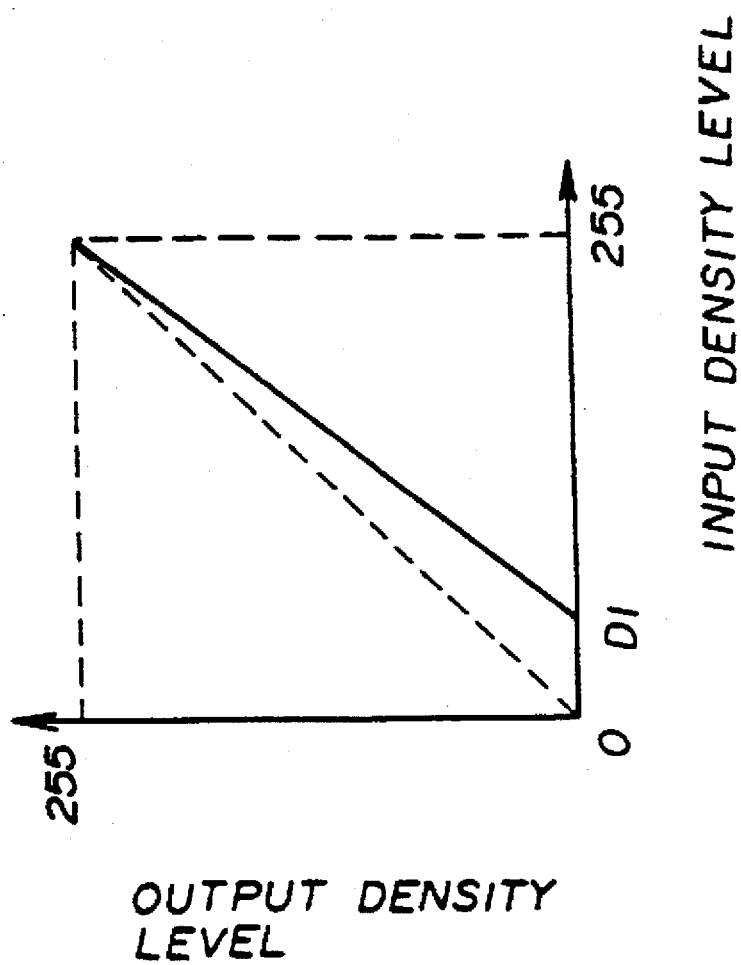
FIG. 1 shows a graph of the gamma conversion function.
Figure 2:
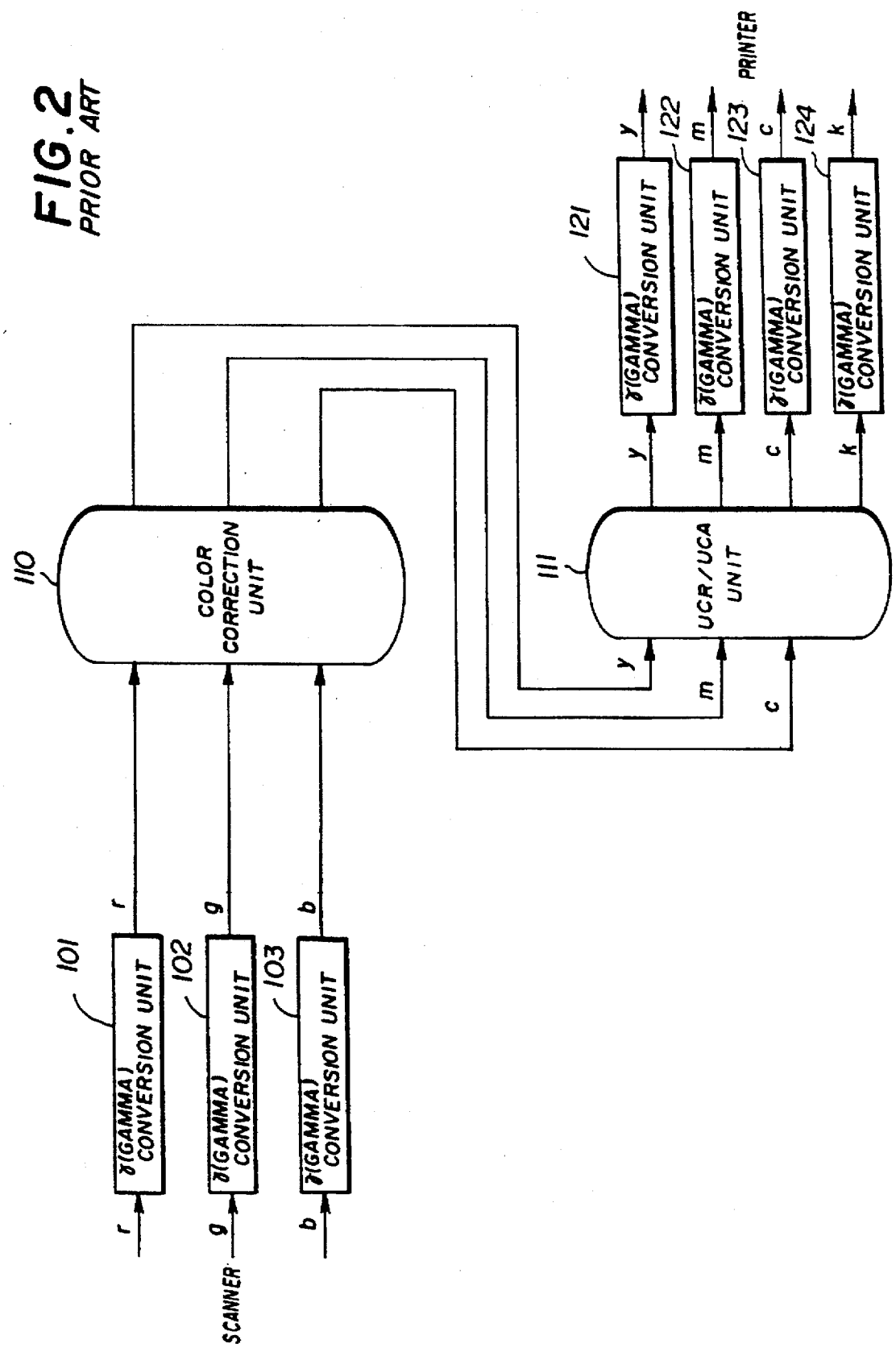
FIG. 2 shows a block diagram of an example of a color image processing apparatus including a color duplicator in the related art.

An image processing operation in the related art will now be described with reference to FIG. 2. In a color image processing apparatus, a color image represented on a sheet of paper is read by means of an image input device including a scanner, and the read image is then converted into digital image data r, g and b constituting color components R, G and B respectively. Then, a gamma conversion is performed on each component of the converted RGB image data r, g and b in respective gamma conversion units 101, 102 and 103 as shown in FIG. 2. The reasons for performing the gamma conversion include correction of inaccuracies resulting from differences in sensitivities between input CCD sensors for R, G and B. (One example of the function of the gamma conversion process comprises that after the gamma conversion is performed on image data, the image data concerning a monochromatic color comprises color components R, G and B which are equal to each other.) The gamma converted image data r, g and b for each pixel, in general, has values in proportion to one of various values including reflectance, density level and lightness associated with the image data.

Then, a color correction process is performed on the gamma converted image data r, g and b for R, G and B in the color correction unit 110. An image output apparatus outputs images by printing the image on a sheet of paper by means of colored ink using colors Y (yellow), M (magenta), and C (cyan) (or Y, M, C, and K (black)). Thus, the image data r, g and b has to be converted into image data y, m and c (, and k) concerning the ink colors Y, M, and C (, and K). The above color correction units execute the conversion process in which the image data r, g and b is converted into image data y, m and c (, and k) by converting the color space from the color space of the image data r, g and b to the other color space of the image data y, m and c (, and k). (Such a color correction process may include non-linear conversion.) In an image outputting apparatus for printing by means of four colors Y, M, C and K, a UCR(Under Color Removing)/UCA (Under Color Adding) unit performs a UCR/UCA process on the color converted image data y, m, and c, the purpose of the UCR/UCA process being to determine the quantity of black (k) ink, other than yellow (y), magenta (m) and cyan (c) inks, to be used in the printing. Then, before printing, gamma conversion units 121, 122, 123 and 124 perform gamma conversion on the UCA/UCR processed image data y, m, c, and k, the gamma converted image data y, m, c, and k being then output to the printer.

A part of a sheet of paper, on which sheet an original color image has been formed, the above mentioned part of the sheet of paper (an undesirable density level part) being other than a part where the original image is formed (an original image part), may have, in general, an undesirable non-zero represented density level. The undesirable represented density level may result from various causes including stains accidentally occurring on the sheet of paper. Thus, the image processing apparatus in the related art as shown in FIG. 2 may duplicate the undesirable density level part as well as the original image part when the image processing apparatus accurately duplicates the contents of the entire sheet of paper. Removal of the undesirable density level representation (background noise removal) is preferred as mentioned above.

Figure 3:
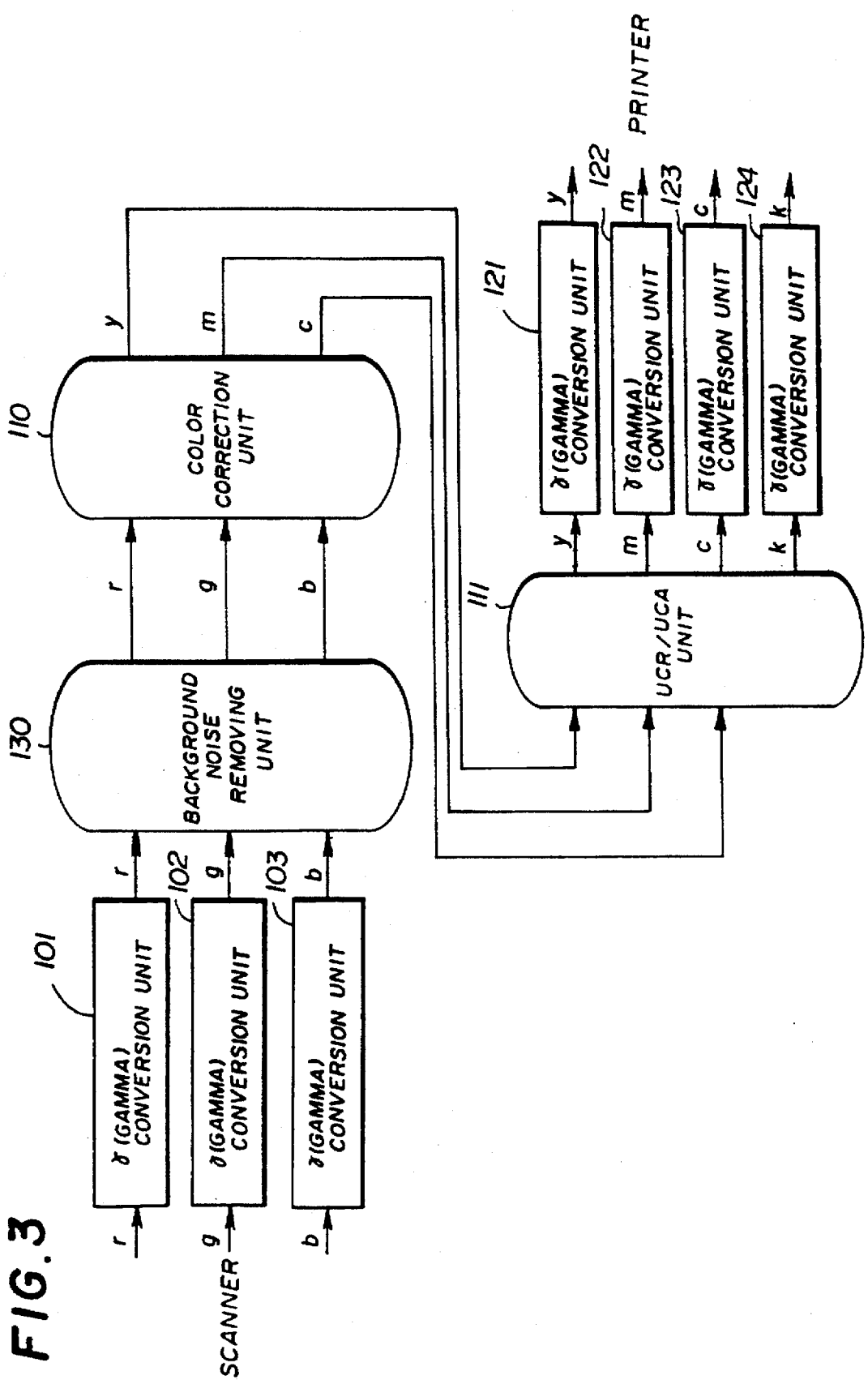
FIG. 3 shows a block diagram applying to various embodiments according to the present invention, that is, a color image processing apparatus having a background noise removing unit located at a position next to the input gamma conversion units, which background noise removing unit being added to the constitution shown in the block diagram of FIG.2.

A unit for use in the background noise removal may be provided in any stage in the image processing apparatus of FIG. 2. For example, such a background noise removing unit may be provided after the input gamma conversion units 101–103 and before the color correction unit 110, the background noise removing process being thus performed on the image data r, g and b. The background noise removing unit may also be provided after the color correction unit 110, the background noise removing process being thus performed on the image data y, m and c. Furthermore, the background noise removing process may be performed on image data with values varying in a range between 0 (corresponding to white) and 255 (corresponding to black) (in the case of a density level having one of 256 values), which image data values vary linearly with respect to the respective density levels of corresponding read image pixels for each color component. As mentioned above, characteristics in which data values vary linearly with variation of corresponding densities will be called "density linear characteristics" hereinafter. Alternatively, the background noise removing process may be performed on image data with values varying in a range between 0 (corresponding to black color) and 255 (corresponding to white) (in the case of a density level having one of 256 values), which image data values vary linearly with respective reflectance of corresponding read image pixels for each color component. Characteristics in which data varies linearly with reflectance will be called "reflectance linear characteristics" hereinafter. In an image processing apparatus shown in FIG. 3, the background noise removing unit 130 is provided so as to perform the background noise removing process on image data r, g and b obtained from the input gamma conversion units 101–103. In FIG. 3, the same reference numerals as those used in FIG. 2 are used for units equivalent to those in FIG. 2.

Some embodiments according to the present invention will now be detailed. One embodiment according to the present invention performs a background noise removing process on image data having r, g and b color components, the image data having been obtained as a result of a gamma conversion process having been performed on the image data obtained by reading an original image by means of a scanner. The above gamma conversion process obtains r, g and b values which are linear for corresponding color-component densities in the original image. Furthermore, in another embodiment according to the present invention, the background noise removing process may be performed on color image data signals other than those obtained as the result of the above gamma conversion process.

The purpose of the present invention is to effectively reduce a hue change which may occur during a background noise removing process in the related art as mentioned above. Such a hue change may occur because in the related art the background noise removing process may be undesirably performed on even pixels having low lightness or a high density. A reason for undesirably performing a background noise removing process on low lightness parts of an image in the related art will now be detailed. In the related art, whether or not a background noise removing process is to be performed on a part of an image is determined using the density of a given part with respect to each color component among the color components of the part, the determination being executed independently for each color component. That is, when the color component R of the part is associated with low density, a background noise removing process is performed on the part even though the other color components G and B are associated with high densities, the part comprising the high density actually in combining all the color components R, G and B. To achieve the effective reduction of occurrence of such a hue change, an embodiment according to the present invention performs a background noise removing processes only for particular parts of a sheet of paper, which sheet of paper has an original image to be processed. The particular parts comprise white parts having high lightness (for example, a background in a character (letter) area in the image), and highlight parts (for example, a background in a picture area in the image). Furthermore, an embodiment of the present invention may perform background noise removing processes without causing hue changes.

[FIRST EMBODIMENT]

In a first embodiment according to the present invention, image data in a first color space based on axes R, G and B (or based on axes Y, M and C) is converted into image data of a second color space based on axes including a lightness axis. Background noise removing processes are then performed on the image data in the second color space.

The second color space may comprise one of various color spaces including a uniform color space of L*, a* and b*, and a uniform color space of L*, u* and v*, but any color space may be used as the second color space if the color space comprises an axis similar to a lightness axis. (The term "uniform color space" refers to a color space wherein a differential in Euclidian distance between two colors in color space is identical to a differential between the two colors sensed by means of the human senses. Other color spaces comprising a lightness axis include the HVS color space. In a color space such as that comprising a lightness axis, a background noise removing process may be achieved easily by simply changing a value in the lightness axis; this background noise removing process does not cause a hue change.) The first embodiment of the present invention uses a L*u*v* color space.

Figure 4:
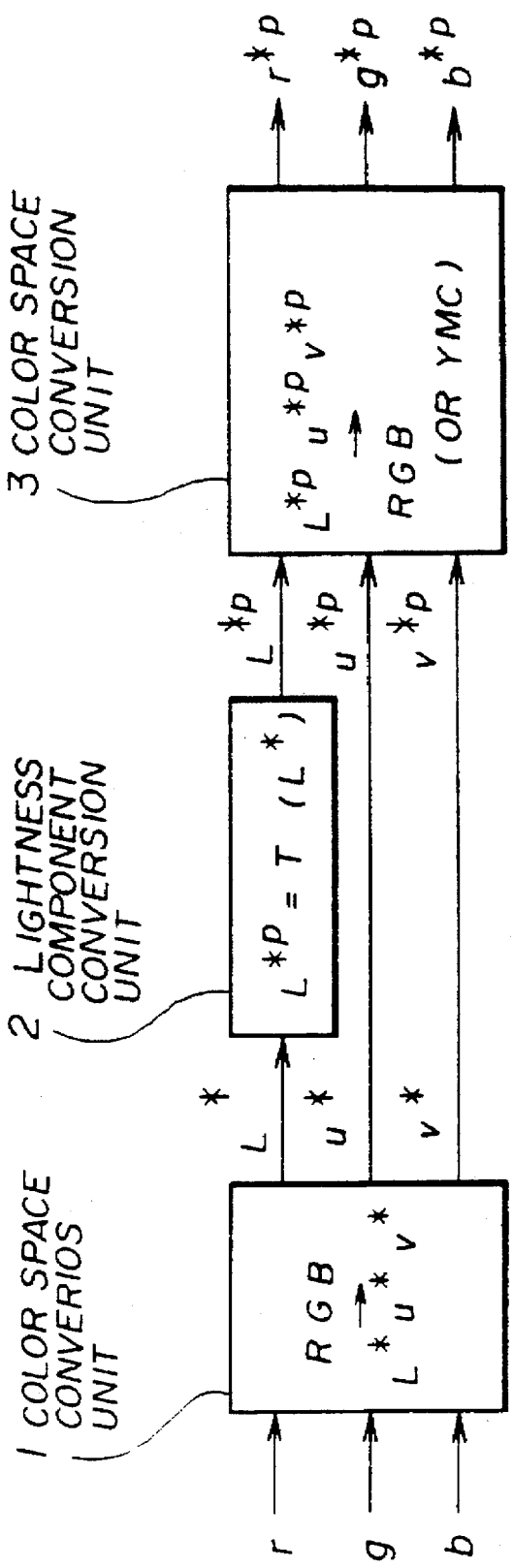
FIG. 4 shows a block diagram of a background noise removing unit according to a first embodiment of the present invention.

The background noise removing unit of the first embodiment of the background noise removing apparatus and method according to the present invention will now be described with reference to the block diagram in FIG. 4. The background noise removing unit comprises a color space conversion unit 1, a lightness component conversion unit 2, and another color space conversion unit S. The color space conversion unit 1 converts input image data in a RGB color space into image data in a L*u*v* color space. The lightness conversion unit 2 changes a lightness value L* to a value corresponding to a lightness lighter than that of the original value. The color space conversion unit 3 converts image data in the L*u*v* color space into image data in the RGB color space.

Figure 5:
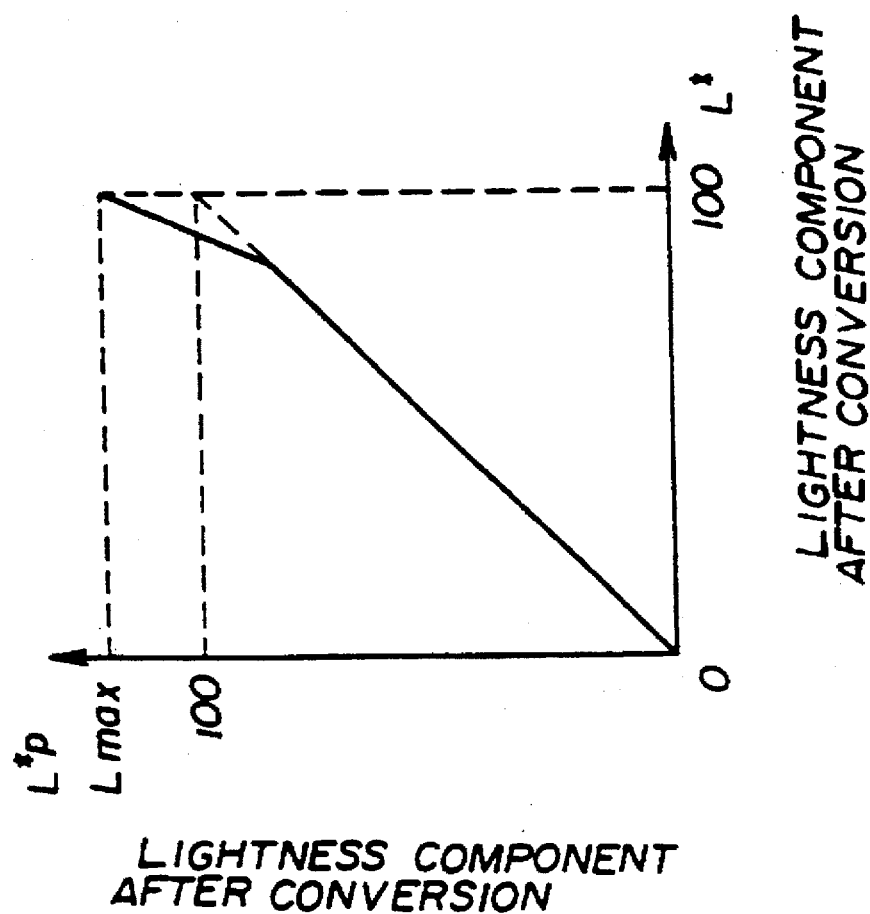
FIG. 5 shows a graph of a lightness conversion function according to the first embodiment of the present invention.

Input image data provided to the color space conversion unit 1 comprises color image data, each color component of which data can take on a range of multi-values. The color space conversion unit 1 converts, for each pixel, the input image data in the RGB color space into image data in the L*u*v* color space. That is, the color conversion unit 1 performs coordinate conversion, using a method for coordinate conversion that is well-known. The lightness component conversion unit 2 converts a lightness value L* of the color-space-converted image data so as to obtain a lightness-converted lightness component L*$^p$, the lightness conversion being executed as shown in FIG. 5. That is, in the lightness conversion, parts of the original image having parts which are white (having high lightness) or highlit have the lightness components corresponding thereto raised. As a result, as shown in FIGS. 6A and 6B, the zone Z1 in the L*u*v* color space in which zone the output image is represented is transformed to the zone Z2 so that the high lightness part of the representing zone extends upward, background noise removal being thus achieved. (In FIGS. 6A and 6B, the vertical axis represents the lightness axis L*, the upward direction thereof representing the high lightness direction and the downward direction representing low lightness direction. Further, in FIGS. 6A and 6B, the vertical plane includes different hue axes v* and u* ) That is, densities of a high lightness part or a low-density part in an image are to be changed to be lower densities. If the change in density exceeds 100% of the full lightness range available by the apparatus, the densities are to be changed to be 100% of the full lightness range, that is, the corresponding part does not print.

In this background noise removing process, the u* and v* components of the color space converted image data L*, u* and v* are not changed and are provided to the color space conversion unit 3 as u*$^p$ and v*$^p$ together with the lightness-converted-component L*$^p$. That is, $L^{*p}(a)=T\{L^*(a)\}$, $u^{*p}(a)=u^*(a)$, and $v^{*p}(a)=v^*(a)$, where T{ } represents a predetermined lightness conversion function (by means of, for example, a lookup table) to be performed on L*(a), where "a" refers to a particular pixel. Thus, the hue data of the image data does not change in the lightness conversion.

After the lightness conversion by the lightness conversion unit 2, the color space conversion unit 3 performs a color space conversion on the above L*$^p$, u*$^p$ and v*$^p$ so as to convert image data in the L*u*v* color space into image data in the RGB color space. This space conversion is performed in order to provide image data compatible with an output device. That is, for example, the image data to be provided must be in the RGB color space when the image is to be represented on a display screen, and the image data to be provided must be in the YMC color space when the image is to be represented on a sheet of paper by means of a color printer. When overflow or underflow occurs in the image data as a result of the color space conversion by means of the color space conversion unit 3, the image data is rounded off so that the component values may be changed in order to cause the image data to fall in a predetermined RGB color space (or YMC color space). (For example, [r, g, b]=[255, 255, 255] when overflow of all color components r, g and b of the image data occurs, and [r, g, b]=[0, 0, 0] when underflow of all color components r, g and b of the image data occurs).

In the first embodiment, the density conversion process may be easily executed in a color space such as having an axis similar to an axis concerning lightness, the conversion being executed by changing a value of the lightness axis component. Thus, the embodiment is useful for modifying an image editing apparatus, such as one originally having the color space conversion function, so as to make the apparatus have the background noise removing function. Further, the density conversion, in which conversion density conversion manners may be determined using densities of the corresponding respective color components of image data, is able to improve background-noise removing performance by eliminating hue change and maintaining tone continuity during the background noise removing process. The reduction of hue change is particularly effective for processing a picture area in an image, which picture area may have a half-tone part; moreover effective reduction of hue change is required to convert data of such a half-tone part.

[SECOND EMBODIMENT]

The above mentioned first embodiment of the present invention requires a relatively large amount of computation for color conversion. However, the apparatus according to the first embodiment is useful particularly for an image editing apparatus because such an image editing apparatus normally originally has processing means for processing image data in a uniform color space. Thus, a great addition of hardware and/or software is not needed for the additional provision therein of a background noise removing function according to the first embodiment, namely because a large part of the existing system in the image editing apparatus may be used for the additional background noise removing function. On the other hand, the first embodiment is not useful for a color duplicator which processes image data in an RGB color space or a YMC color space. This is because in such a color duplicator a great addition of hardware and/or software is needed for the additional provision of a background noise removing function according to the first embodiment therein, namely because most of the existing system in the color duplicator may not be used for the additional background noise removing function. For application of the present invention to such a color duplicator, a second embodiment of the present invention is useful, the second embodiment having a function similar to that of the first function even though the second embodiment does not have the color conversion process of the first embodiment. A background noise removing unit according to the second embodiment of the background noise removing apparatus and method according to the present invention will now be described.

The background noise removing unit of the second embodiment handles input image data, which image data comprises color image data having R, G and B color components each of which color components may take on a range of multi-values. The respective color component image data [r, g, b]=[0, 0, 0] for white, and [r, g, b]=[255, 255, 255] for black. The background noise removing unit performs density conversion in which, in order to simplify the density conversion process, in RGB color space, a color located near the origin is determined as white or a highlight. (A color determined as white or as a highlight is a color on which the background removing process will be performed.)

Figure 7A:
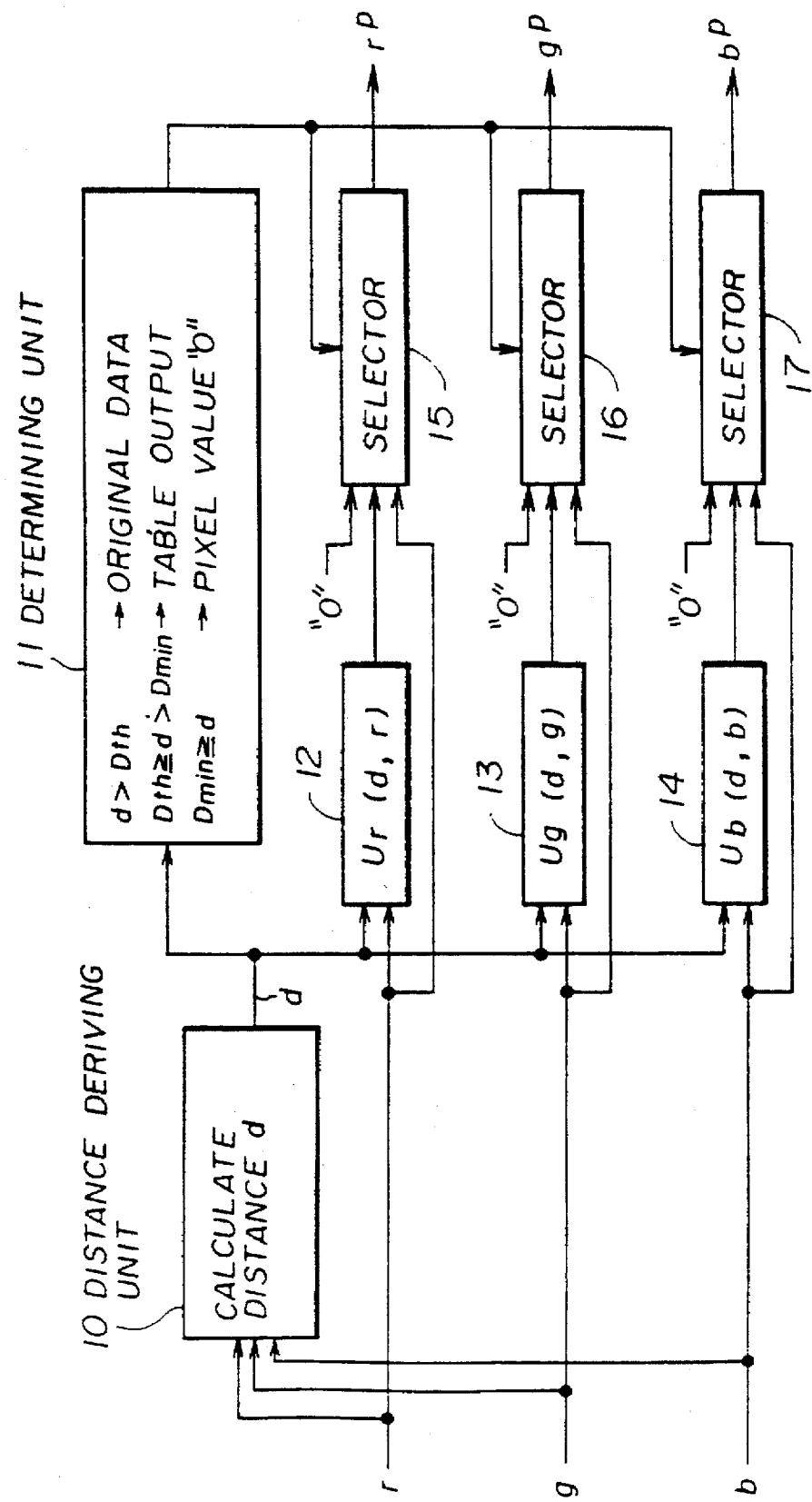
FIG. 7A shows a block diagram of a background noise removing unit according to a second embodiment of the present invention.

The background noise removing unit of the second embodiment will now be described with reference to the block diagram in FIG. 7A. The background noise removing unit comprises a distance deriving unit 10, a determining unit 11, table units 12, 13 and 14, and selectors 15, 16 and 17. The distance deriving unit 10 calculates the distance d between the origin and a color corresponding to input image data. The determining unit 11 compares the derived distance d with a predetermined threshold value. The table units 12, 13 and 14 store predetermined pixel values which will be used for density conversion. The selectors 15, 16 and 17 select, according to the output of the determining unit 11, an appropriate one from among the original input data, table output data and pixel value "0". The distance deriving unit 10 derives for each pixel the Euclidian distance d measured from the origin (that is, the white reference point) in the RGB color space. That is, the distance d may be derived by the following equation:

$$d=(r^2+g^2+b^2)^{(1/2)}.$$

Figure 8:
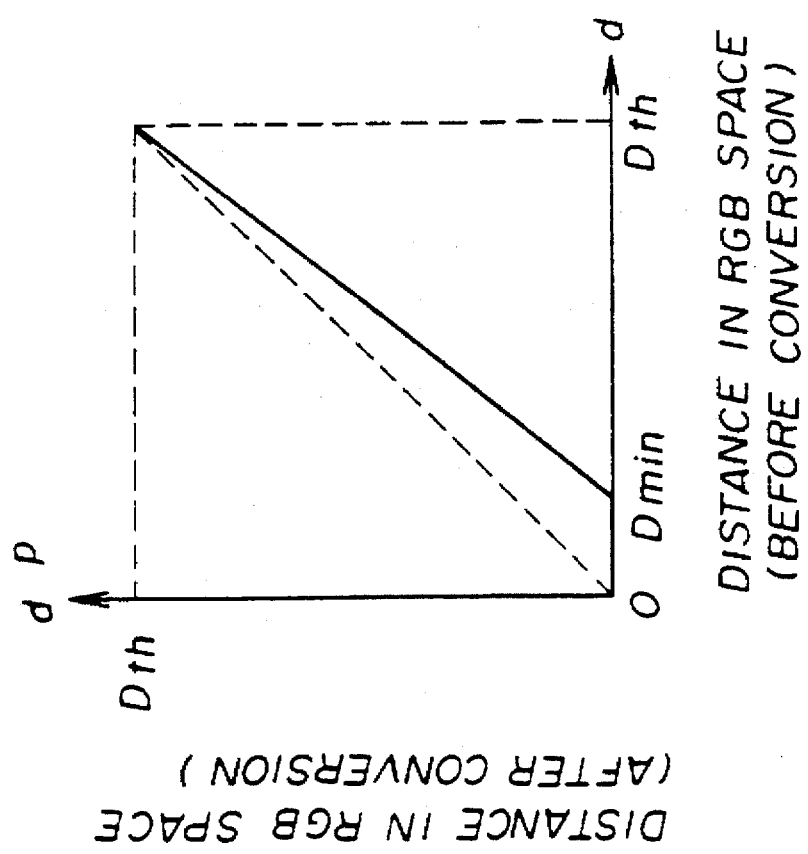
FIG. 8 shows a graph of a distance conversion function according to the second embodiment of the present invention.

The determining unit 11 compares the derived distance d with the predetermined threshold value Dth and the determining unit 11 then outputs signals to the selectors 15, 16 and 17 so as to cause the selectors to select the original data r, g and b so as to output the original data respectively when d>Dth. The determining unit 11 outputs signals to the selectors 15, 16 and 17 so as to cause the selectors to select density-converted data when d≦Dth. In the case of selecting density-converted data, the selectors 15, 16 and 17 select (0, 0, 0) for (R, G, B) respectively when d≦Dmin, where Dmin is a predetermined threshold value smaller than Dth. In the case of selecting data obtained as a result of performing continuous density conversion, the selectors 15, 16 and 17 select density-converted data when Dmin<d≦Dth. The continuous density conversion is performed in accordance with a function T(d), which function comprises a continuous line between Dmin and Dth as shown in FIG. 8. Thus, $d^p=T(d)$ is obtained by the continuous density conversion, $d^p$ being a distance measured from the origin.

In the continuous density conversion according to the second embodiment of the present invention, the ratios between the R, G and B components of the image data obtained by the density conversion are caused to be identical to the ratios between the R, G and B components of the image data in the states in which the density conversion has not be performed thereon. This identity between the ratios of R, G and B of the image data is required in order to effectively reduce hue change which may occur during the density conversion, preservation of the hue values of the image data during image data processing process being preferable. The above identities of the ratios of the R, G and B components of the image data during the density conversion imply the following equations:

$$r^p/r = g^p/g = b^p/b = d^p/d,$$

where $r^p$, $g^p$, and $b^p$ represent the image data concerning R, G and B respectively. By the above equations, $r^p$, $g^p$, and $b^p$ can be expressed by the following equations respectively:

$$r^p=sr,$$

$$g^p=sg,$$

$$b^p=sb,$$

where s=T(d)/d.

Figure 7B:
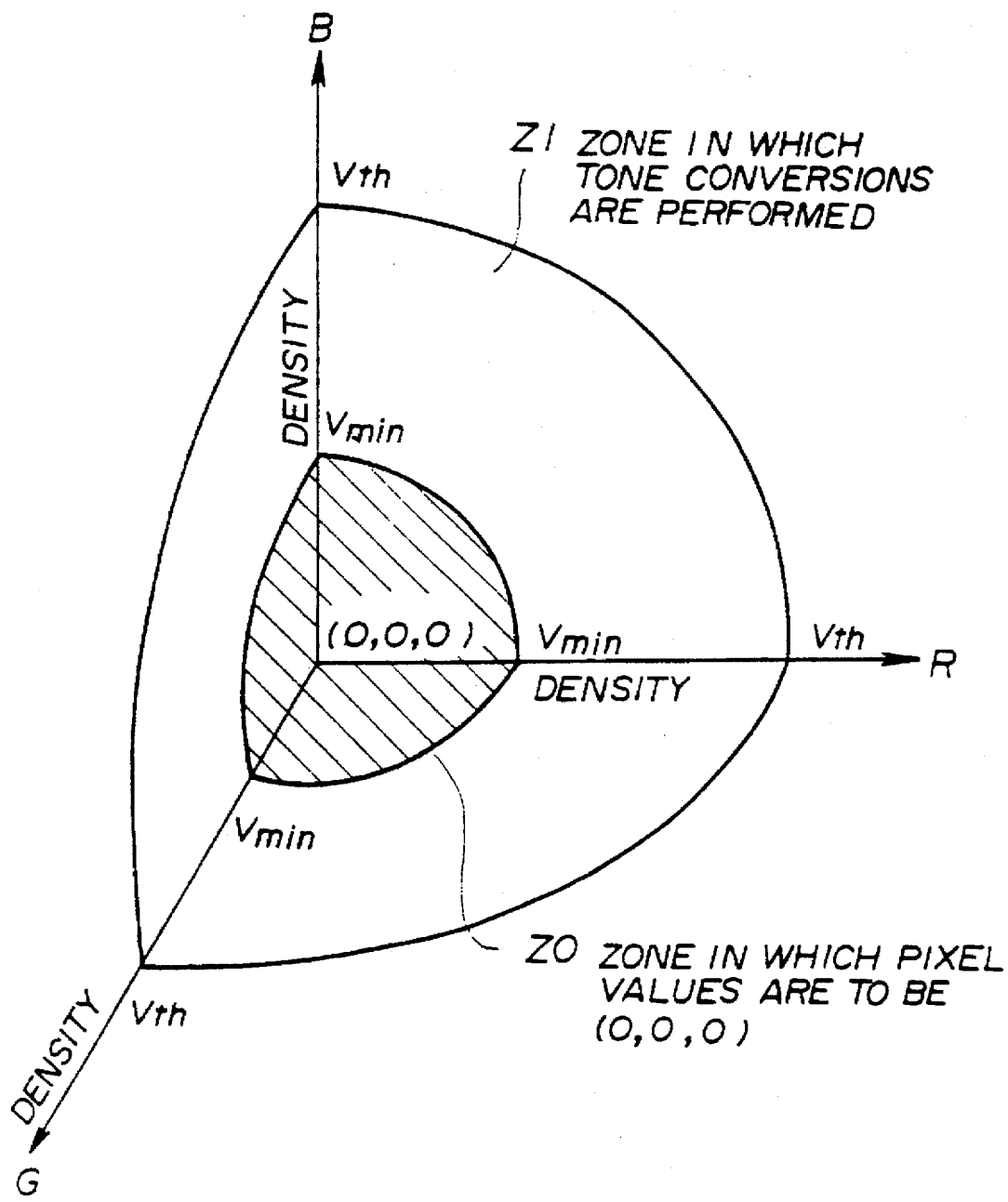
FIG. 7B shows a density conversion function according to the second embodiment of the present invention.

In summarizing the above, the selectors 15, 16 and 17 select data so that (as shown in FIG. 7B):

where $d=(r^2+g^2+b^2)^{1/2}$, ($r^p$, $g^p$, $b^p$)=(r, g, b) if d>Dth, ($r^p$, $g^p$, $b^p$)=(0, 0, 0) if d≦Dmin (the zone Z0 in FIG. 7B), ($r^p$, $g^p$, $b^p$)=(sr, sg, sb) if Dmin<d≦Dth (the zone Z1 in FIG. 7B), where s=T(d)/d. Thus, hue change in an RGB color space may be effectively reduced in a background noise removing process in accordance with the second embodiment of the present invention.

In accordance with the above explanation, appropriate data, to be selected for data concerning the distance d where Dmin<d≤Dth, is to be derived prior to the selection, the derivation being executed by performing the continuous density conversion on the original data (r, g, b). The above derivation process includes a dividing operation (T(d)/d) and a multiplying operation (sr, sg, and sb) as mentioned above. In the second embodiment of the present invention, such dividing and multiplying operations are replaced by corresponding lookup tables. That is, density-converted image data values ($r^p$, $g^p$, $b^p$) for each pixel can be obtained with a lookup table by using the input image data values (r, g, b) for each pixel and the corresponding distance d. A lookup table may be built for each color component in accordance with the function graph of FIG. 8, the lookup table being used for converting the input image data value (r, g, b) for each pixel into density-converted image data values ($r^p$, $g^p$, $b^p$) for each pixel. In the lookup tables, the addresses are assigned to be values of d and respective values of r, g, and b, both values ranging between Dmin and Dth. The table units 12, 13 and 14 have the lookup tables comprised of ROM (or RAM) tables Ur, Ug, and Ub respectively.

Because the value of Dth is in general relatively small, the sizes of memories constituting the lookup tables may be relatively small. For example, if Dmin=9 and Dth=19, the sizes of the memories may be determined by the following bit calculations:

4 bits required for expressing the range (10–19) of variation of distance d, namely the variation range being 10, 5 bits required for the range (0–19) of variation of each of r, g and b, namely the variation range being 20, and 5 bits required for the range (0–19) of variation of each of $r^p$, $g^p$ and $b^p$, namely the variation range being 20. As a result, the lookup tables Ur, Ug and Ub may comprise three memories respectively, each memory having 9 (4+5) bit addresses (for inputting the above 4 bits of distance d and the above 5 bits of r, g and b) and 5 bit words (for outputting the above 8 bits of $r^p$, $g^p$ and $b^p$).

In the second embodiment, the density conversion process may be executed without performing the color space conversion. Thus, this embodiment is useful for the color duplicator which originally does not have such function as the color space conversion. Further, utilization of the lookup table system may also have an effect for reducing the amount of hardware and/or software needed in the construction.

[THIRD EMBODIMENT]

Figure 10A:
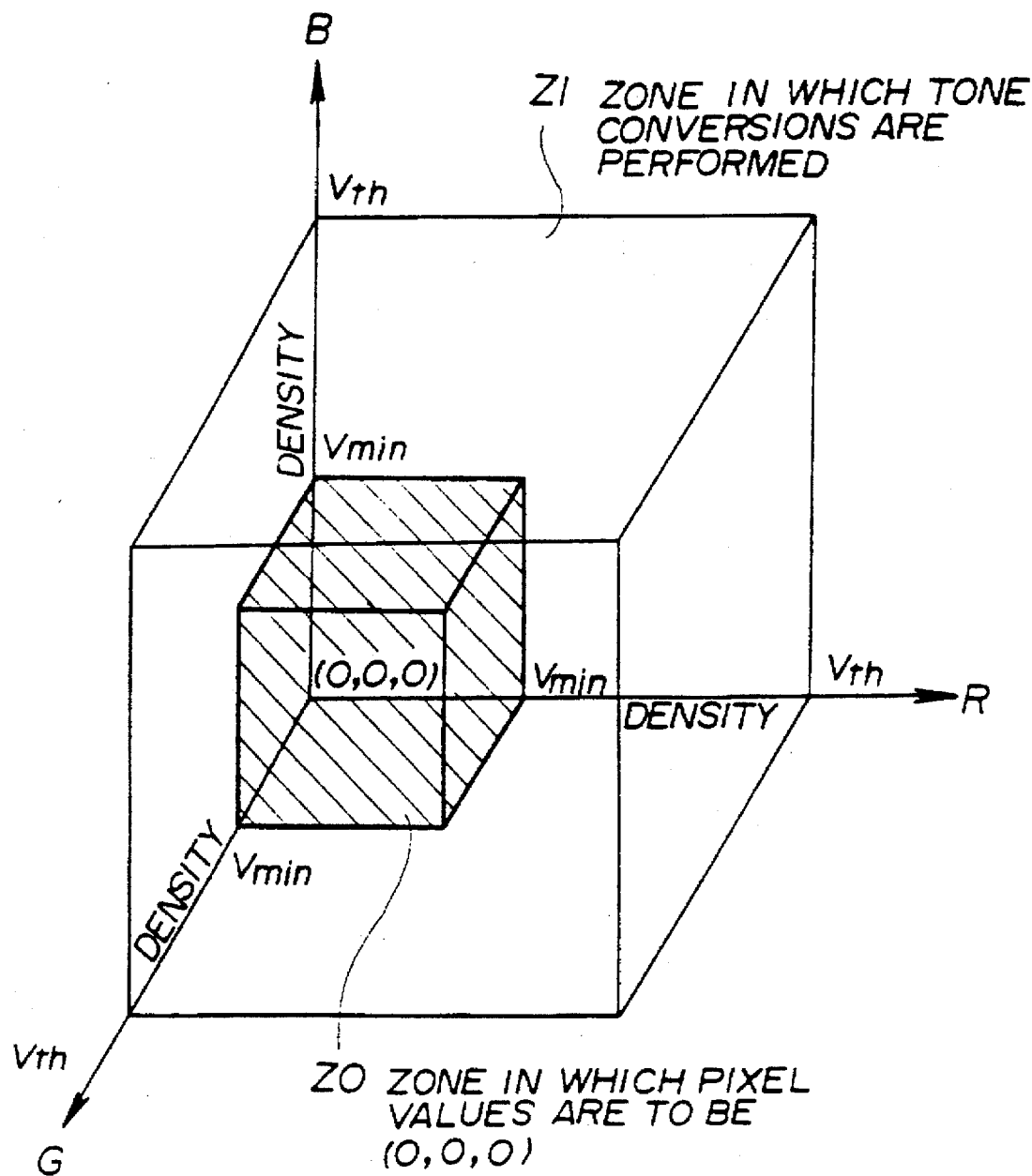
FIGS. 10A and 10B show a density conversion function according to the third embodiment of the present invention.
Figure 10B:
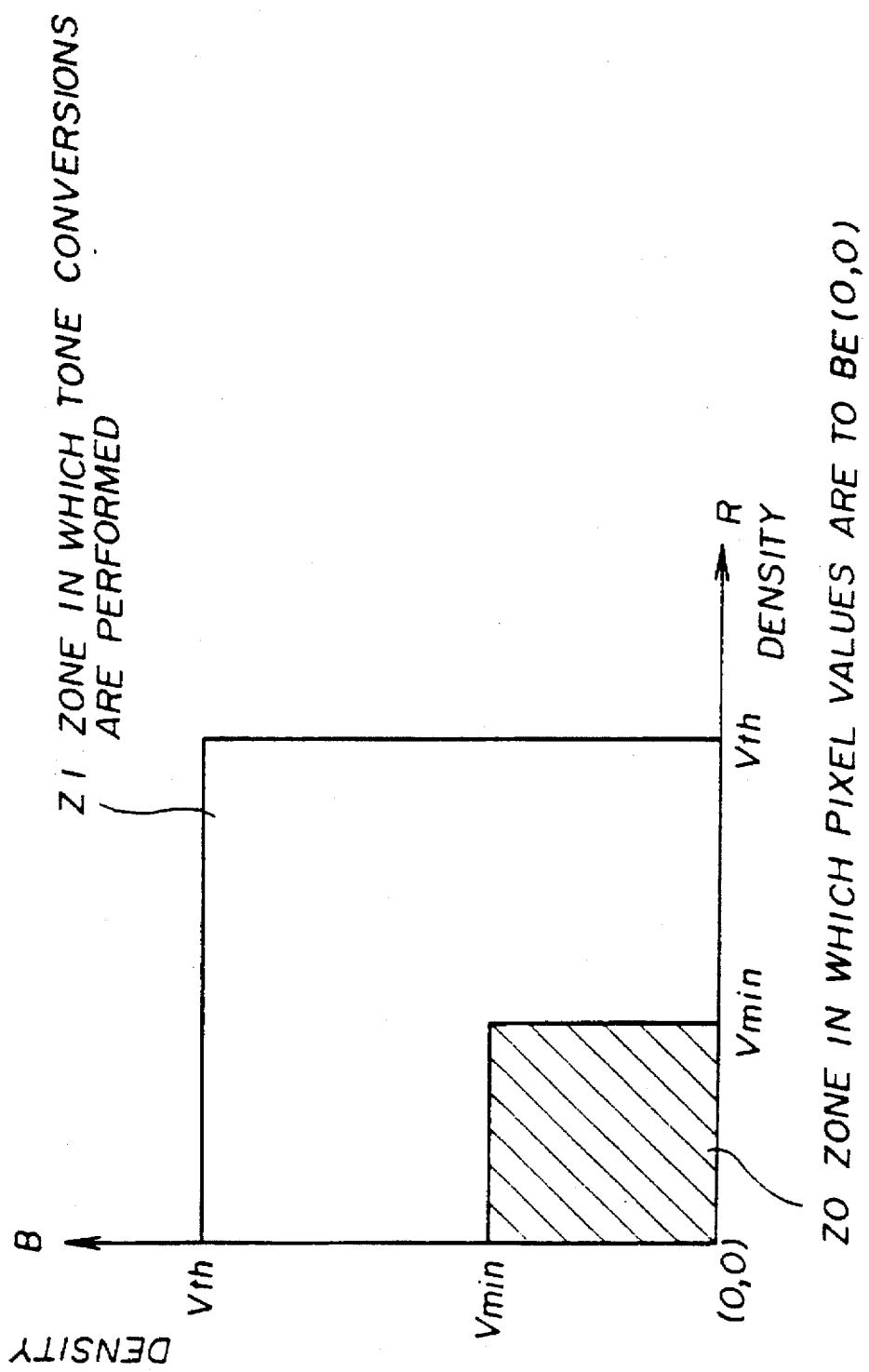

A background noise removing unit according to a third embodiment of the background noise removing apparatus and method according to the present invention will now be described. In the third embodiment, the Euclidian distance to be obtained by calculation in the second embodiment is replaced with the maximum value from among R, G and B density levels (that is, the maximum density level value of r, g, and b); this replacement simplifies hardware construction of the background noise removing unit. Parts other than those replaced in the third embodiment are substantially the same as those in the second embodiment. That is, where max=MAX(r, g, b);

($r^p$, $g^p$, $b^p$)=(r, g, b) when max>Vth;

($r^p$, $g^p$, $b^p$)=(0, 0, 0) when max≤Vmin (the zone Z0 in FIGS. 10A and 10B); and ($r^p$, $g^p$, $b^p$)=(sr, sg, sb) where s=T(max)/max when Vmin<max≤Vth (the zone Z1 in FIGS. 10A and 10B).

Figure 9:
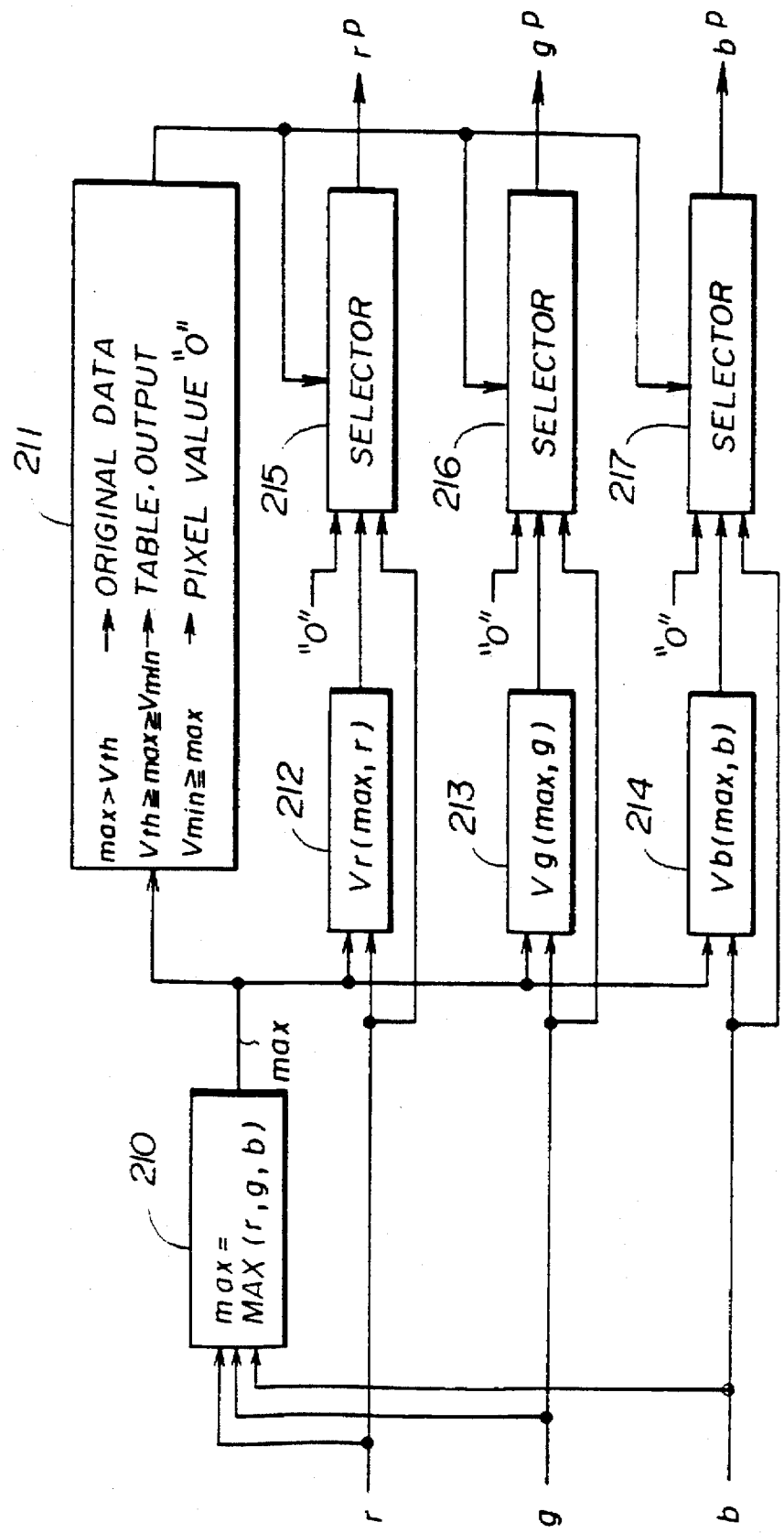
FIG. 9 shows a block diagram of a background noise removing unit according to a third embodiment of the present invention.

With reference to FIGS. 10A and 10B, the zones Z0 and Z1, as mentioned above, will be described in the RGB color space, the zones having positions concerning image data on which are to be performed either the density conversions ($r^p$, $g^p$, $b^p$)=(0, 0, 0) or the density conversions ($r^p$, $g^p$, $b^p$)=(sr, sg, sb). (Hereinafter, for the sake of simplification, figures showing such zones will comprise R-B plane figures such as FIG. 10B, and figures showing zones comprising RGB spaces such as FIG. 10A will be omitted. Such R-B plane figures will show the zones typically represented in the R-B planes and the corresponding zones represented in the RGB spaces may be easily understood by examining the zones represented in the R-B planes.) Similarly to the second embodiment, in the third embodiment the density conversions are performed on the image data concerning positions located near the origin of the RGB color space. In FIG. 9, table units 212, 213, 214 comprising lookup tables Vr, Vg, and Vb respectively comprise tables similar to the tables Ur, Ug, and Ub in the second embodiment.

Application of the third embodiment of the present invention to a color image processing apparatus employing an adaptive coding system may eliminate a problem caused by the adaptive coding system. This adaptive coding system is disclosed in Japanese Patent Application No. 3-327138 filed by the present applicant, U.S. patent application No. Ser. No. 906,461, filed Jun. 30, 1992 corresponding to the Japanese Patent Application. In the disclosed adaptive coding system, a color image is separated into a "black character and white background area" and a picture area. Then the system performs a "coding for a two-value image" on the image data concerning the separated "black character and white background area"; and performs a "coding for a multi-value image" on the image data concerning the separated picture area. The above problem, caused by the adaptive coding system, occurs due to the following. A pixel value of the image data concerning a white background in the "black character and white background area" is to be "0" after the "coding for a two-value image" has been performed thereon even though the originally pixel value had a certain value not "0". On the other hand, the "coding for a multi-value image" may cause the original pixel value to maintain a certain value, corresponding to an original certain value, not "0" for the image data concerning a white background in the picture area. Thus, there may occur differences between the pixel values concerning the white backgrounds in the "black character and white background area" and the pixel values concerning the white backgrounds in the picture area, after the corresponding respective coding have been performed on the respective pixel values. The above differences of the pixel values results in an apparent border line between the ensuing areas of different densities in the output image. The ensuing difference of densities in the output image is located on the boundary between the "black character and white background area" and the picture area, and the apparent border line occurs during reproduction of the image using the coded image data. The third embodiment of the present invention may eliminate a hue change during the density conversions performed on the picture area (because the ratios between r, g and b do not change during the density conversions) and may eliminate the above apparent border line occurring at the boundary.

The third embodiment is useful because complicated calculations such as calculation of Euclidian distance may be eliminated. Thus, hardware and/or software constructions for executing the complicated calculations may be reduced.

[FOURTH EMBODIMENT]

A background noise removing unit according to the fourth embodiment of the background noise removing apparatus and method according to the present invention treats reflectance instead of density levels (which density level are treated in the second and third embodiments). In the above second and third embodiments, the maximum value MAX (r, g, b) is obtained or a white level "s" (degree of whiteness) (0–1) is obtained based on a distance from the origin of a position, in an RGB color space, the position concerning the image data, the distance comprising a distance between the position and the origin (white reference point). The second and third embodiments execute density conversions correspondingly to the obtained white level "s". As mentioned above, input data obtained from a scanner scanning an original image made on a sheet of paper may comprise two kinds of data, density linear data and reflectance linear data.

The fourth embodiment concerns such reflectance linear data as such in a background noise removing process. In the case of input data comprising reflectance linear data, pixel values of the data for respective color components for white image portions comprise (255, 255, 255) and those for black color comprise (0, 0, 0), where the data may vary in 256 levels.

Figure 12:
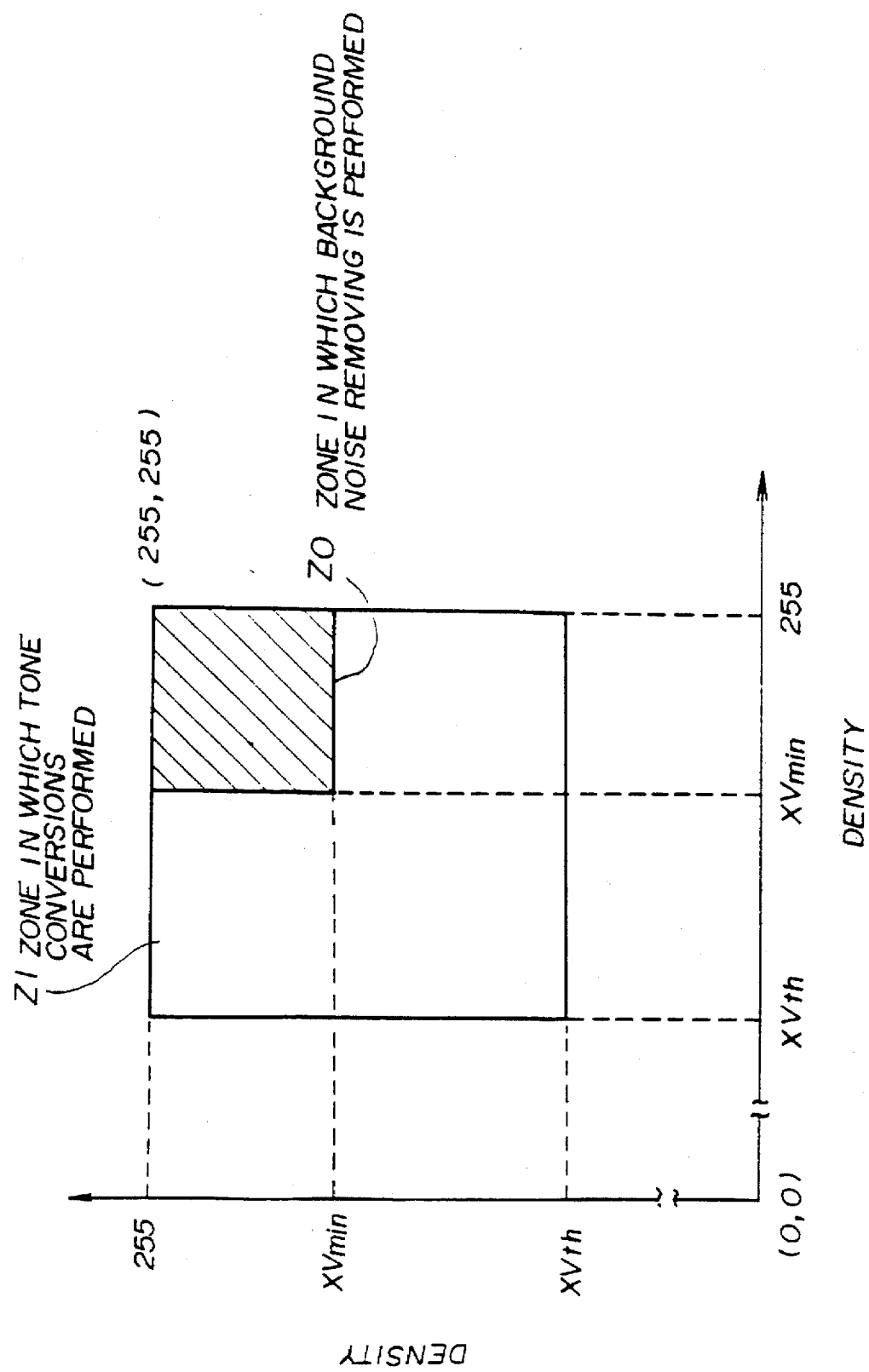
FIG. 12 shows a background noise removing function according to the fourth embodiment of the present invention.

Thus, the background noise removing process is executed by converting the image data concerning positions, in the R, G and B space, located near the point (255, 255, 255). In FIG.12, image data concerning positions located in the defined zone which may be represented respectively in the R-B, B-G, and G-R planes (the defined zone represented in the B-G and G-R planes is not shown in FIG.12) is to have the reflectance conversion performed thereon, for example, the defined zone represented in the R-B plane comprising a zone Z1 defined as $R \geq XVth$ and $B \geq XVth$.

The fourth embodiment may use one of two methods to obtain such a white level "s". The first such method comprises a method based on the minimum value among r, g and b; and the second such method comprises a method based on both the minimum value of r, g and b and the maximum density difference among r, g and b. A calculation method of the background noise removing process using the first such method will now be described. Pixel values ($r^{pp}$, $g^{pp}$, $b^{pp}$) of the image data for respective color components may be obtained according to the reflectance conversions of the fourth embodiment, by the following steps:

Where min=MIN(r, g, b);

s=1, thus, ($r^{pp}$, $g^{pp}$, $b^{pp}$)=(r, g, b) when min<XVth;

s=0, thus ($r^{pp}$, $g^{pp}$, $b^{pp}$)=(255, 255, 255) when min$\geq$XVmin (the zone Z0 in FIG. 12);

s=T(min$^p$)/min$^p$ where min$^p$=255−min and s comprises a value in a range 0–1, ($r^{pp}$, $g^{pp}$, $b^{pp}$)=(255-$r^p$, 255-$g^p$, 255-$b^p$) and, by using the obtained value s, ($r^p$, $g^p$, $b^p$)=s(255-r, 255-g, 255-b) when XVmin>min$\geq$XVth (the zone Z1 in FIG. 12).

Figure 11:
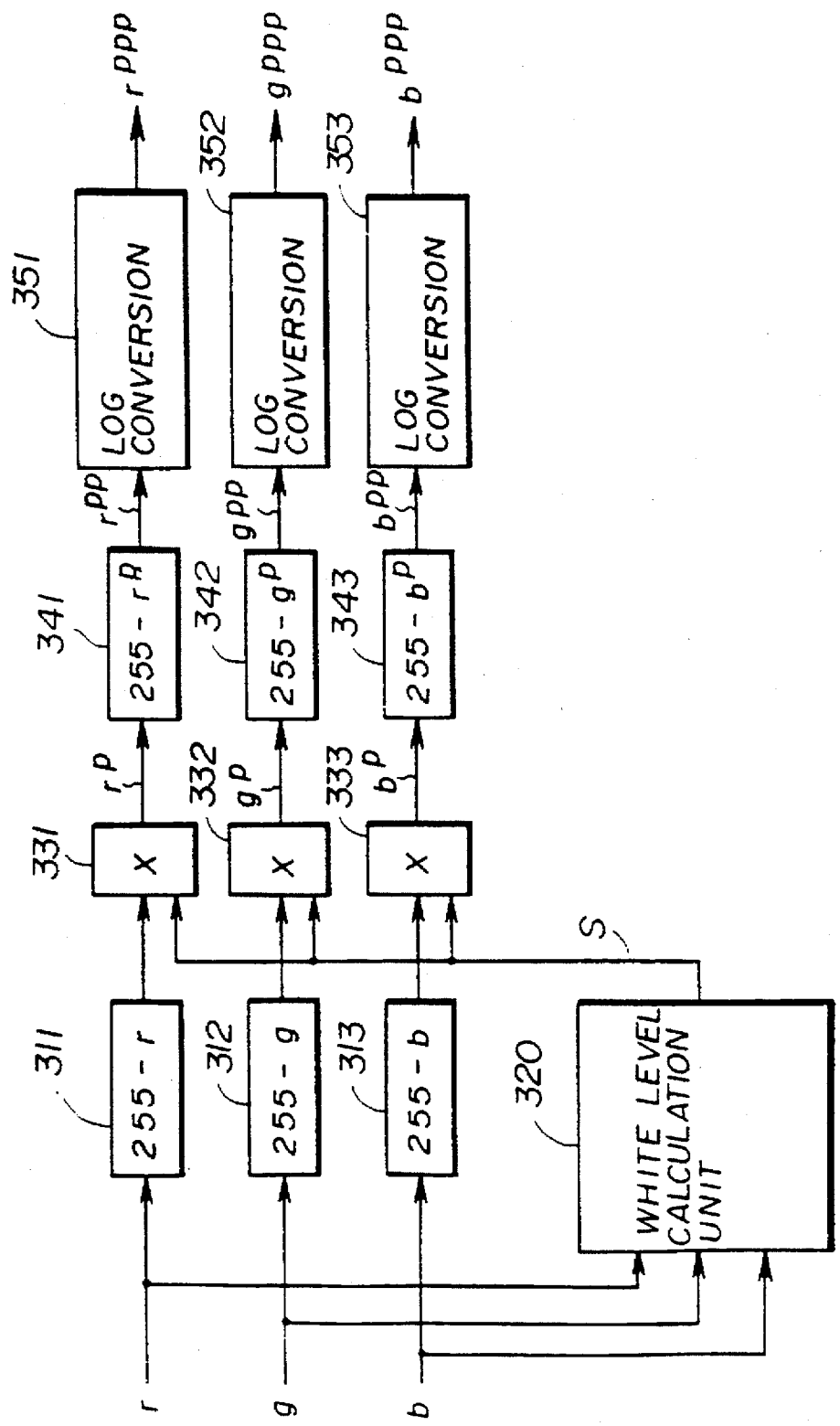
FIG. 11 shows a block diagram of a background noise removing unit according to a fourth embodiment of the present invention.

The background noise removing unit according to the fourth embodiment will now be described with reference to the block diagram in FIG. 11. The values r, g, b in proportion to reflectance of the original image are input to the background noise removing unit. A white level calculation unit 320 performs calculations to obtain such white levels "s" for each pixel. Then, using the white levels "s", ($r^p$, $g^p$, $b^p$) are obtained by the equation ($r^p$, $g^p$, $b^p$)=s(255-r, 255-g, 255-b) by means of elements 311, 312, 312, 331, 332, and 333; and then ($r^{pp}$, $g^{pp}$, $b^{pp}$) are obtained by the equation ($r^{pp}$, $g^{pp}$, $b^{pp}$)=(255-$r^p$, 255-$g^p$, 255-$b^p$) by means of elements 341,342 and 343. Then log conversions are performed on ($r^{pp}$, $g^{pp}$, $b^{pp}$) by means of elements 251, 352 and 353. (In general, it has been found that density values have an approximately logarithm relation to corresponding reflectance values. Hereinafter, the term log function refers to the $\log_{10}$ function.) Thus, the image data values ($r^{ppp}$, $g^{ppp}$, $b^{ppp}$) corresponding to the density levels are obtained, and the obtained image data values are output to output means including, for example, a display screen.

In the fourth embodiment, in the background noise removing process the reflectance values are used instead of the density values. In this way, accurate hue constant density conversion may be achieved because where r, g and b comprise color components of image data in reflectance linear characteristics, identity of density ratios among the corresponding respective color components r, g and b of image data may always result in identity, between the colors, of the corresponding respective hues, as mentioned above.

[FIFTH EMBODIMENT]

A background noise removing unit according to a fifth embodiment of the background noise removing apparatus and method according to the present invention will now be described. The background noise removing unit of the fifth embodiment is used for performing a background noise removing process on such image data y, m, c and k concerning respective Y, M, C and K density levels. A color duplicator, in general, uses such image data y, m and c or y, m, c and k which image data are obtained by conversion of such image data r, g, b density level data. The image data y, m and c or y, m, c and k is to be output to a corresponding printer.

Figure 13:
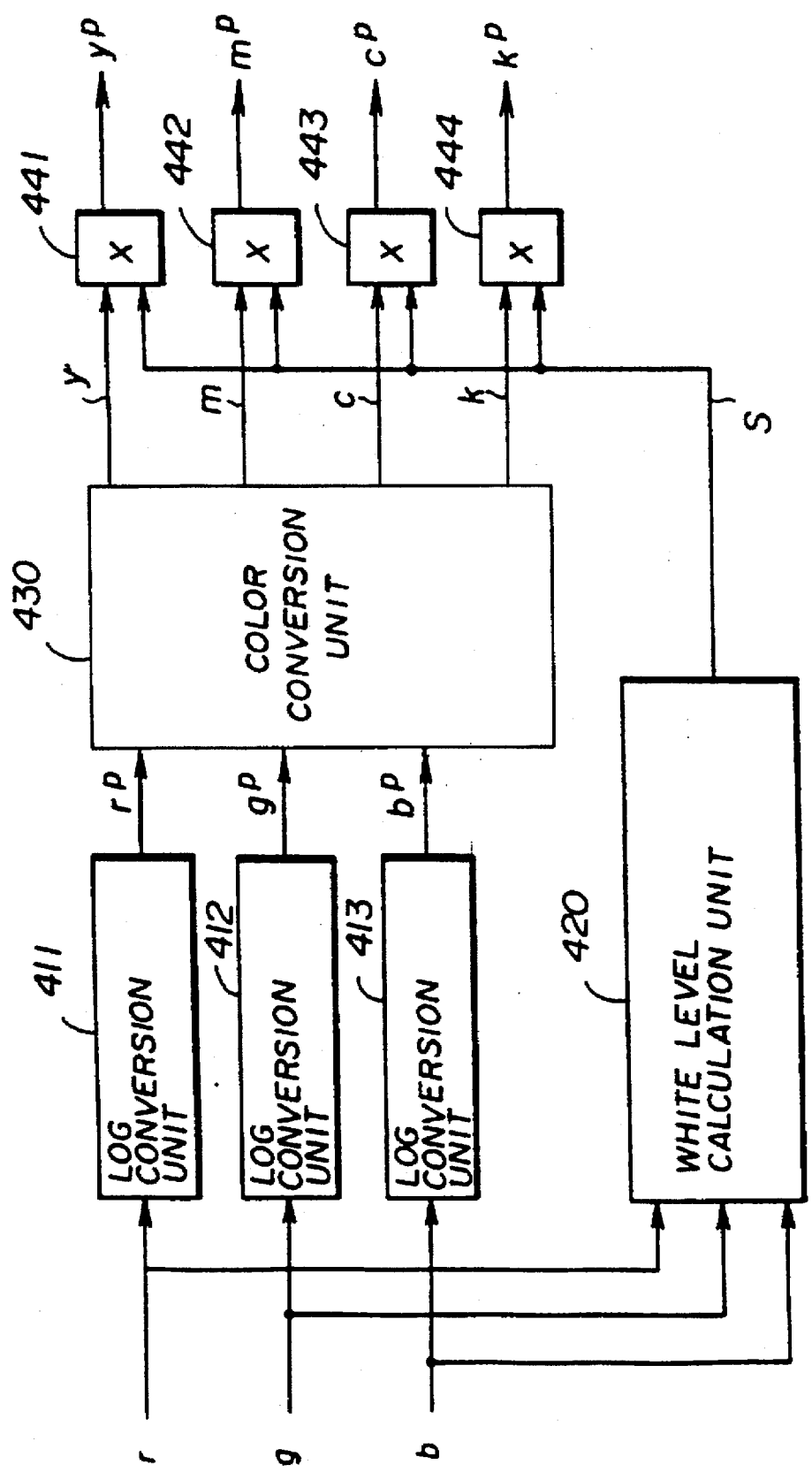
FIG. 13 shows a block diagram of a background noise removing unit according to a fifth embodiment of the present invention.

The background noise removing unit according to the fifth embodiment of the present invention will now be described with reference to the block diagram in FIG. 13. In the background noise removing unit of the fifth embodiment, such white levels "s" are obtained by calculation by means of a white level calculation unit 430, the calculation being based on reflectance values of input data r, g and b corresponding to R, G and B. The input data r, g and b concerning the reflectance have log conversions performed thereon, so as to obtain image data $r^p$, $g^p$, and $b^p$ corresponding to density levels by means of the log conversion units 411, 412, and 413. Then, the data $r^p$, $g^p$, and $b^p$ has color conversion performed thereon by means of a color conversion unit 430, so as to obtain data y, m, c and k corresponding to Y, M, C and K. Then, density conversions are performed on such y, m, c, and k density level data based on the obtained white levels "s" by means of elements 441, 442, 443, and 444. The calculations for obtaining the white levels "s" are similar to those used in the fourth embodiment. The density conversions are executed similarly to those in the second embodiment, thus the ratios between y, m, c and k are identical to those between $y^p$, $m^p$, $c^p$, and $k^p$, which ratios have been obtained by performing the density conversions on the y, m, c and k. Such a method as in the fifth embodiment may be applied to a color conversion system by which y, m, c and k, comprising reflectance linear data, may be obtained by means of a corresponding color conversion process.

The fifth embodiment is useful in application to a color printer because the density conversions are performed on the density values y, m, c and k and the new density values corresponding to the values y, m, c and k are then obtained by simple hardware construction, which values may be directly used for printing the color image. Such a construction is particularly useful for a color printer having a printing system in which system, for example, the yellow ink is output for an entire page, the magenta ink is then output for the entire page, the cyan ink is then output for the entire page, and the black ink is then output for the entire page.

[SIXTH EMBODIMENT]

A background noise removing unit according to a sixth embodiment of the background noise removing apparatus and method according to the present invention will now be described. The sixth embodiment may solve a problem caused in the above third embodiment. In the third embodiment, as mentioned above, only the maximum value MAX(r, g, b) of density levels concerning r, g and b is used for obtaining such white levels "s". In such a method in the third embodiment, thus, even though an object pixel has a certain color, the object pixel is determined to be white if the density of the object pixel is relatively low. This is the above problem caused in the third embodiment.

An ideal background noise removing comprises density levels of only a real background part being converted into "0". Thus, in the ideal background noise removing, such a conversion as changing a density level into "0" should not be performed on a pixel having a certain color. Thus, in the sixth embodiment, such white levels "s" are obtained using both the maximum value MAX(r, g, b) and the maximum difference among the density levels concerning r, g and b, the maximum difference being expressed as $\delta(r, g, b)$.

A concept of the sixth embodiment is that image data concerning color having relatively low density and further having a relatively small differential between densities of color components (for example, $\delta(r, g, b)$) is determined as data concerning a white image portion and thus is to have the background noise removing process performed thereon. On the other hand, image data concerning color having a relatively large differential in density among the color components is not to have the background noise removing process performed thereon even if the color components of the above color have relatively low densities.

A calculation method according to the above concept of the sixth embodiment will now be described with reference to FIG. 14. In the description, input data r, g, and b comprises input data concerning density level, however, input data r, g and b may, instead, comprise data concerning reflectance, and a process similar to that in the description below may be executed in the sixth embodiment as in the fourth embodiment, in the sixth embodiment.

Figure 14:
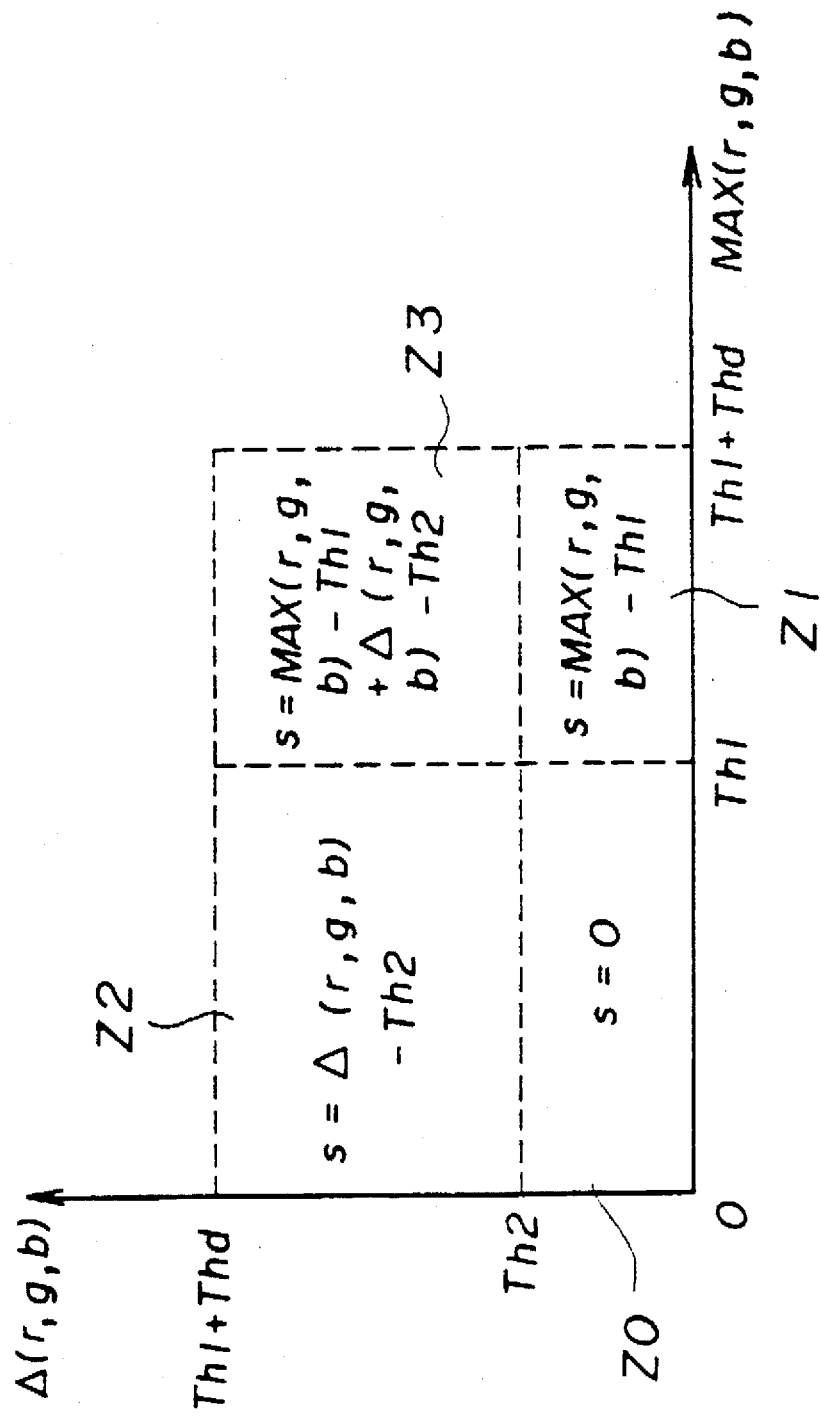
FIG. 14 shows a graph of a calculation function for obtaining approximately white density levels, the function according to a sixth embodiment of the present invention.

In a condition where max=MAX(r, g, b), D=$\delta$(r, g, b), and $\delta$(r, g, b) comprises the maximum value among |r-g|, |g-b|, and |r-b|, s=0 when (max<Th1)&(D<Th2) (the zone Z0 in FIG. 14);

s=max-Th1 when (Th1$\leq$max<Th1+Thd)&(D<Th2) (the zone Z1 in FIG.14);

s=D-Th2 when (max<Th1)&(Th2$\leq$D<Th2+Thd) (the zone Z2 in FIG. 14);

s=max-Th1+D-Th2 when (Th1$\leq$max<Th1+Thd)&(Th2$\leq$D<Th2+Thd) (the zone Z3 in FIG. 14), but s=Thd if s>Thd as a result of the above calculations; and s=Thd when (max$\geq$Th1+Th2)or(D$\geq$Th2+Thd) regardless of the result of the above calculations.

Then, a white level $s^p$ is obtained by a equation $s^p$=T(s), where the function T(s) may comprise any function which may be used for obtaining a resulting value comprising a value in a range 0–1, the resulting value being obtained using "s" as the variable. (For example, T(s)=s/Thd, then $s^p$=1 if s=Thd.)

Using the obtained $s^p$, such a density conversion is performed on data wherein during the conversion a hue concerning the data is to be constant. In the sixth embodiment, such a density conversion may be performed on either each one of r, g and b components or on each one of y, m, c, and k components. In the case of performing the conversion on each of r, g, and b, the results ($r^p$, $g^p$, $b^p$) may be obtained by the following equation:

$$(r^p, g^p, b^p)=(s^p r, s^p g, s^p b).$$

In the sixth embodiment, undesirable density conversion, such as a pixel having certain color being changed to be white, may be prevented. Thus, the background noise removing performance may be improved. This is particularly effective for a picture area in an image, which picture area has a highlight part having a light tone color; with this embodiment such a highlight part may be duplicated or reproduced without removing the light tone color.

[SEVENTH EMBODIMENT]

Figure 15:
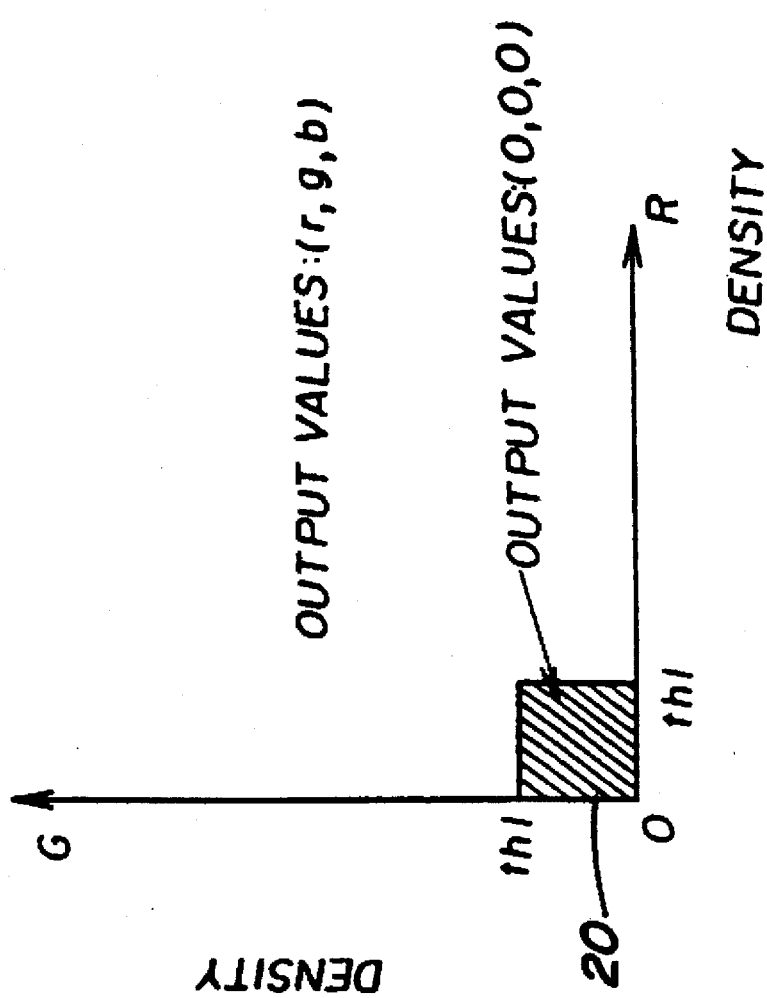
FIG. 15 shows a graph of a background noise removing function according to a seventh embodiment of the present invention.
Figure 18:
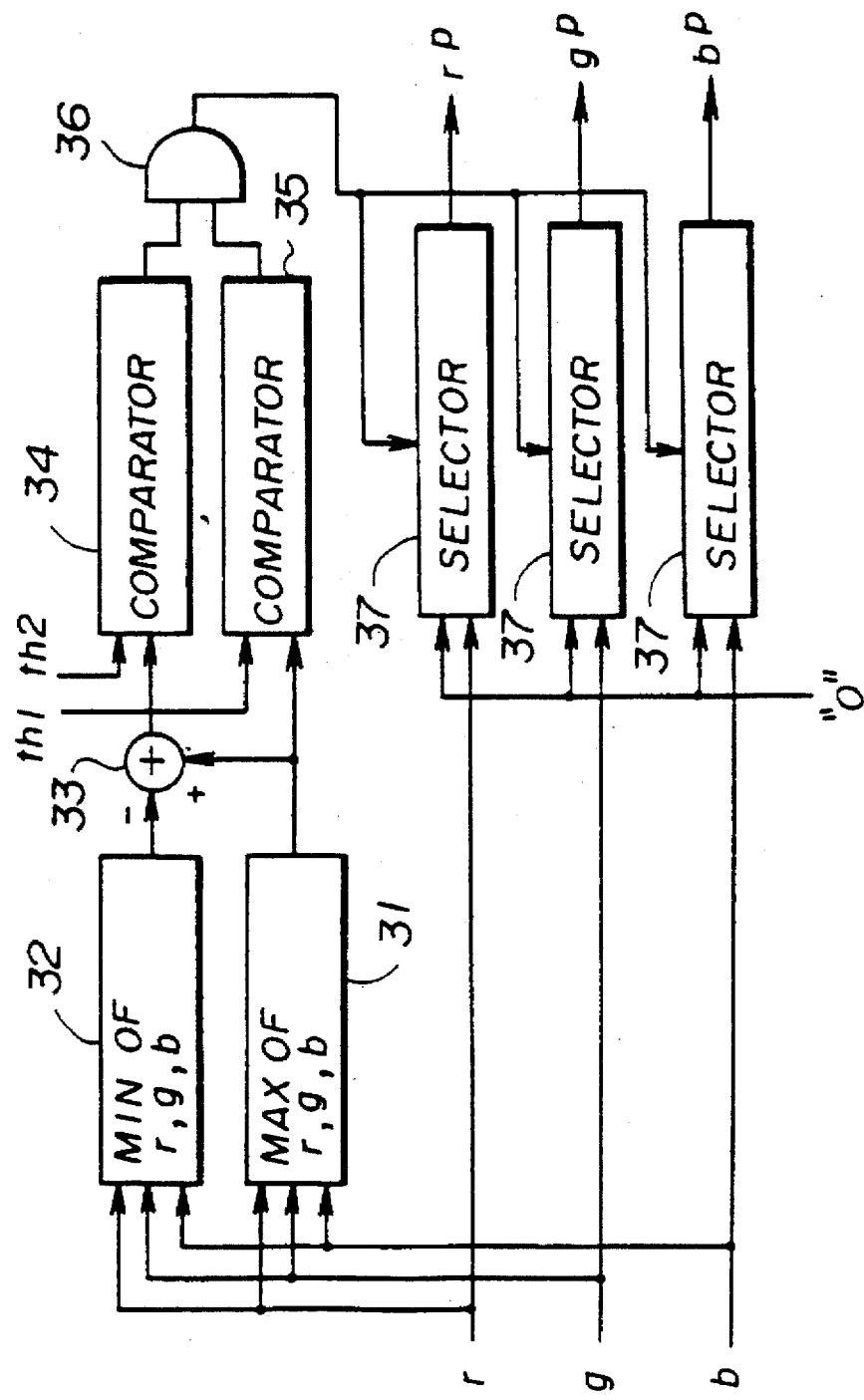
FIG. 18 shows a block diagram of a background noise removing unit according to the eighth embodiment of the present invention.

A background noise removing unit according to a seventh embodiment of the background noise removing apparatus and method according to the present invention will now be described with reference to FIG. 15. A concept of the seventh embodiment is that only colors of pixels constituting a part of an original image are removed, the colors of pixels to be removed comprising relatively low density colors. This concept is based on the fact that a background part of the image comprises a relatively low density color. In the seventh embodiment, a zone is previously defined in the RGB (or YMC) color space. Input data for each pixel concerning a color which corresponds to a position located in the defined zone in the RGB color space is to have a density conversion process performed thereon. FIG. 18 shows, by means of hatching, the zone represented in the R-G plane in the RGB color space. Input data for each pixel concerning a color corresponding to a position located in a zone other than the defined zone in the RGB color space is not to have such a density conversion process performed thereon. In detail, it is determined for each pixel whether or not density levels of all color components r, g and b (or y, m and c) are equal to or less than a predetermined threshold value th1. In the case of the densities of all color components r, g and b being equal to or less than the threshold value th1 (the zone Z0 in FIG. 15), the object pixel is treated as a pixel located on the background, thus output values ($r^p$, $g^p$, $b^p$) for the pixel are provided as $r^p$=$g^p$=$b^p$=0. No density conversion process is performed on pixels other than those having such color components as the density levels of all of the color components r, g and b (or y, m and c) for each pixel are equal to or less than the predetermined threshold value th1. Thus, output values ($r^p$, $g^p$, $b^p$) for each of these other pixels are provided as $r^p$=r, $g^p$=g, and $b^p$=b.

Figure 16:
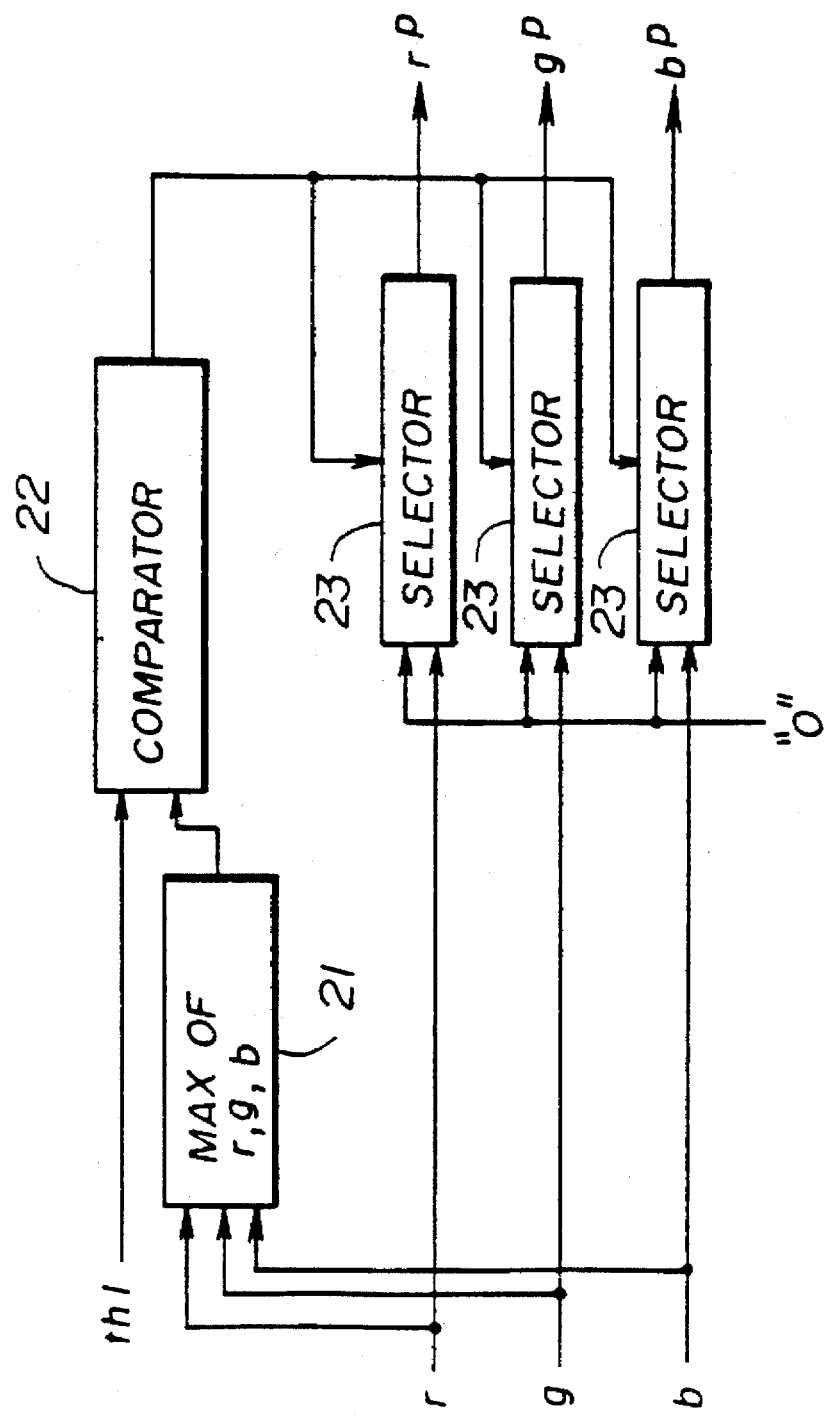
FIG. 16 shows a block diagram of a background noise removing unit according to the seventh embodiment of the present invention.

The background noise removing unit according to the seventh embodiment of the background noise removing apparatus and method according to the present invention will now be described with reference to the block diagram in FIG. 16. Values, for respective color components concerning input data r, g and b will be expressed as [r, g, b] hereinafter. The maximum value "max" among [r, g, b] is obtained by means of a maximum value unit 21. Then, a comparator 22 compares the obtained max with the predetermined threshold value th1. In the case of the max being smaller than the th1, selectors 23, 23, 23 select value "0" respectively. Thus, the selectors 23, 23, 23 output values [$r^p$, $g^p$, $b^p$] for the pixel as $r^p$=$g^p$=$b^p$=0. In the case of the max being equal to or greater than the th1, the selectors 23, 23, 23 select the input pixel values [r, g, b] so as to output [$r^p$, $g^p$, $b^p$] for the pixel as $r^p$=r, $g^p$=g, and $b^p$=b. Such a predetermined threshold value th1 may be previously specified by the user, or the background noise removing unit of the seventh embodiment may automatically detect a density level of a background of an original image to be processed so as to determine the threshold value th1.

[EIGHTH EMBODIMENT]

Figure 17:
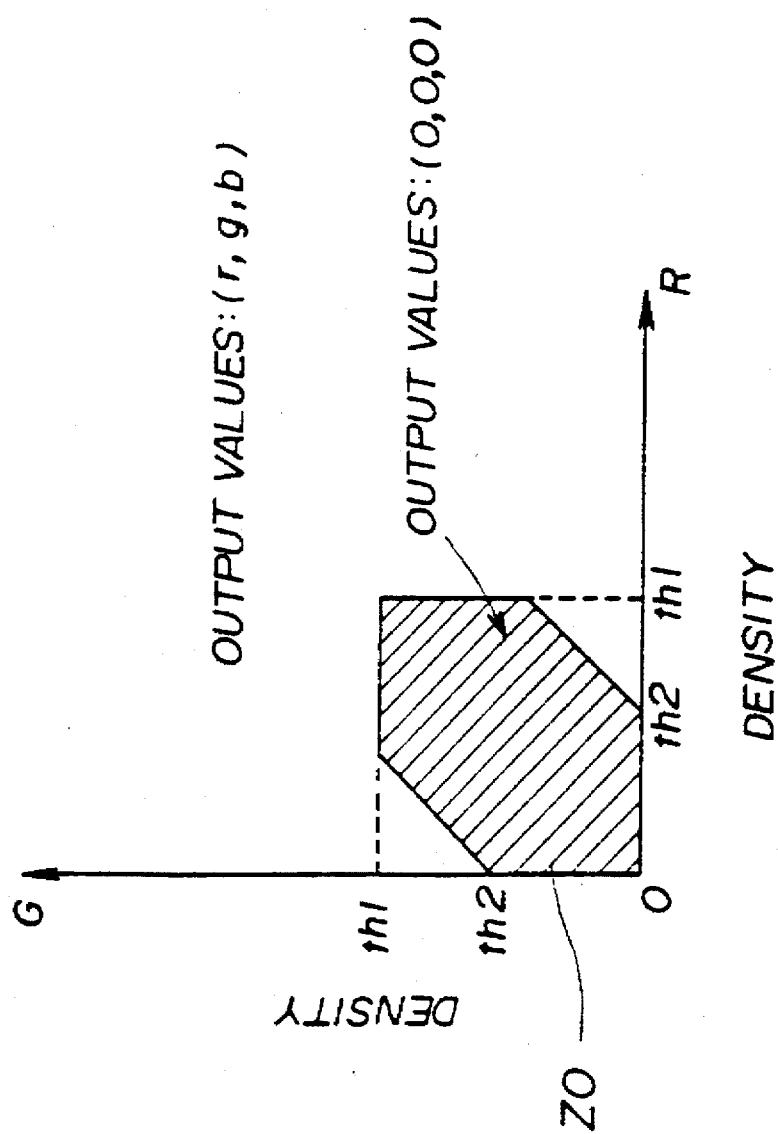
FIG. 17 shows a graph of a background noise removing function according to an eighth embodiment of the present invention.

A background noise removing unit according to an eighth embodiment of the background noise removing apparatus and method according to the present invention will be now described with reference to FIG. 17. In the eighth embodiment, in the same manner as in the above first to seventh embodiments, the background noise removing unit processes image data concerning an original white sheet of paper having an original color image represented thereon. Further, a color image duplicator employing the background noise removing unit may execute image duplication so as to make a duplicated image on another recording sheet of paper so that colors which have been represented on the original sheet of paper may be removed from a part on the original sheet of paper, the removed colors comprising relatively low densities and further comprising nearly monochromatic colors. In the eighth embodiment, a zone is previously defined in the RGB (or YMC) color space. The density conversion process is to be performed on input data for each pixel concerning a color corresponding to a position located in the defined zone in the RGB color space. FIG. 17 shows, by hatching, the zone represented in the plane in the RGB color space. A density conversion process is not to be performed on input data for each pixel concerning a color corresponding to a position located in a zone other than the defined zone in the RGB color space.

In detail, it is determined for each pixel whether or not density levels of all color components r, g, and b (or y, m and c) of the pixel are equal to or smaller than a predetermined threshold value th1. Further, it is also determined whether or not the pixel comprises a nearly monochromatic pixel, the determination being based on, for example, an absolute value of each differential between differentials in density among respective color components of the pixel. Then, in the case of both conditions being fulfilled (the zone Z0 in FIG. 17), both the conditions comprising all color components equal to or smaller than the th1 and the pixel determined to comprise a nearly monochromatic pixel, it is determined that the object pixel is a pixel in the background. Thus, the background noise removing unit outputs $r^p$, $g^p$, and $b^p$ for the pixel as $r^p=g^p=b^p=0$. On the other hand, in the case of none of both the above conditions being fulfilled or in the case of only one of the above condition is fulfilled, the background noise removing unit outputs $r^p$, $g^p$, and $b^p$ for the pixel as $r^p=r$, $g^p=g$, and $b^p=b$, that is, no density conversion is performed on the input data and the input data is output for the pixel.

The background noise removing unit of the eighth embodiment will now be described with reference to the block diagram in FIG. 18. Input data values [r, g, b] for a pixel are input into the background noise removing unit. Then, the maximum value "max" and the minimum value "min" of the [r, g, b] are obtained by a maximum value unit 31 and a minimum value unit 32 respectively. Then, a comparator 35 compares the obtained max with a predetermined threshold value th1. Further, a subtracter 33 calculates max-min (deriving an absolute value of a differential in density among each color component r, g or b). Then, a comparator 34 compares the obtained max-min with a predetermined threshold value th2. (A value max-min is substantially identical to the maximum differential value among r, g and b.)

Then, in the case of both conditions being fulfilled, the conditions comprising that the obtained max is smaller than the th1 and that the obtained max-min is smaller than the th2, by means of an output of an AND gate 36 selectors 37, 37, 37 select "0" Thus, the background noise removing unit outputs $r^p$, $g^p$, and $b^p$ for the pixel as $r^p=g^p=b^p=0$. On the other hand, in the case of neither of the above conditions being fulfilled or in the case of only one of the above condition being fulfilled, the background noise removing unit outputs $r^p$, $g^p$, and $b^p$ for the pixel as $r^p=r$, $g^p=g$, and $b^p=b$ by means of corresponding selections of the selectors 37, 37, 37, that is, no density conversion is performed on the input data and the input data is output for each pixel. Such predetermined threshold values th1 and th2 may be previously specified by the user or the background noise removing unit of the eighth embodiment may automatically detect a density level of a background of an original image to be processed so as to determine the threshold values th1 and th2.

Actually, a color of a sheet of paper used for representing an original color image thereon may not be strictly distributed only along a monochromatic color axis, that is, it may not strictly comprise only a monochromatic color. In many cases, such colors of sheets of paper may be distributed on a biased hue area, that is, it may comprise a rather chromatic color. Thus, in the eighth embodiment of the present invention, another calculation may be used for determining whether or not image data for a pixel comprises respective color component values r, g and b corresponding to a monochromatic color, so as to realize accurate determination of a real background part of an image concerning input data even though the real background part may comprise a certain chromatic color. One example of this other calculation will now be described. The maximum value (δ) among |2r-2g|, |2r-b|, and |2g-b| instead of the maximum value among |r-g|, |g-b|, and |b-r| may be used for such a determination. Thus this method may be used for the determination of monochromaticity such that an image part is determined as monochromatic in a case of the maximum value (δ) among |2r-2g|, |2r-b|, and |2g-b| being smaller than a predetermined threshold value. (This method has a basis that in general a sheet of paper used for such an image duplication comprises a slightly yellow color rather than a completely white color. If a used sheet comprises a slightly yellow color, a weighing-δ operation such as above may be effective so as to improve accuracy of the background detection.)

[NINTH EMBODIMENT]

A background noise removing unit according to a ninth embodiment of the background noise removing apparatus and method according to the present invention will now be described. This background noise removing unit may prevent a problem caused in the above eighth embodiment. The problem caused in the above eighth embodiment will now be described. In the eighth embodiment, it is determined for each pixel whether or not the pixel corresponds to a pixel belonging to a background part. Then, the pixel data determined to be that corresponding to the background part is converted into "0", as output of the background noise removing unit. Thus, when the background noise removing unit of the eighth embodiment processes data concerning a picture image including a highlight part therein, the highlight part may be processed as if the highlight part belonged to the background part. Thus, if the highlight part is determined as the background part, an apparent border line appears at a boundary between a part of the image (the term "apparent border line" means a line made by a density difference between two areas), the image data of this part having been processed as if the part had belonged to the background part, and another part of the image. This apparent border line appearance may degrade quality of the duplicate image a great deal. The background noise removing unit of the ninth embodiment may prevent such apparent-border-line from appearing. To achieve the prevention of appearance of such an apparent-border-line, the background noise removing unit of the ninth embodiment executes a background noise removing process in which hue change occurs only for pixels corresponding to a white color and a nearly white color. Thus, density conversion characteristics may be improved, in which characteristics tone continuity is maintained by eliminating appearance of the above apparent border line in the density conversion for the background noise removing process.

Figure 19:
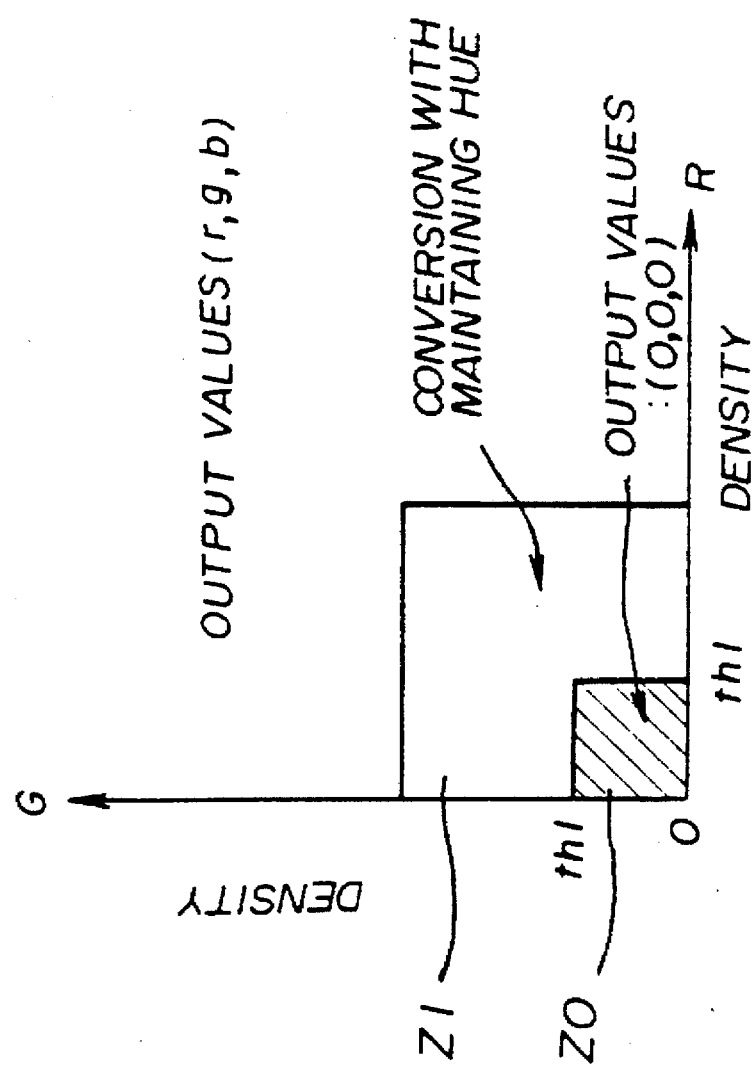
FIG. 19 shows a graph of a background noise removing function according to a ninth embodiment of the present invention.
Figure 20:
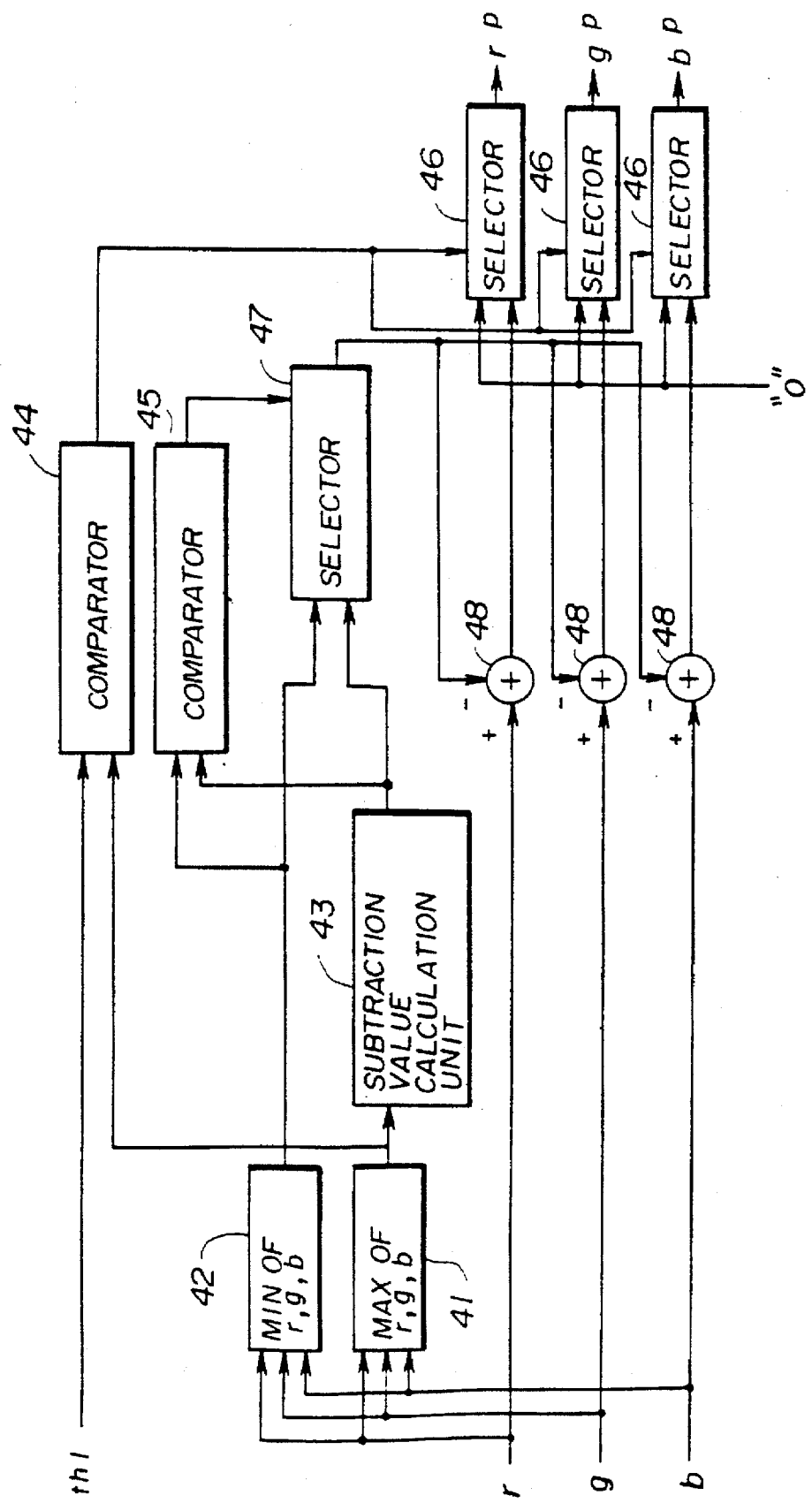
FIG. 20 shows a block diagram of a background noise removing unit according to the ninth embodiment of the present invention.

The background noise removing method according to the ninth embodiment of the background noise removing apparatus and method will now be described with reference to FIG. 19. FIG. 19 shows only the R-G plane of the RGB color space and the other G-B and B-R planes are substantially the same as FIG. 19. In the method, image data concerning pixels having density levels smaller than a predetermined threshold value th1 (the zone Z0 in FIG. 19), the pixels being thus determined to be pixels belonging to the background part, is to be "0". Further, image data concerning pixels having density levels greater than the predetermined threshold value th1 and being located in a previously defined area (the zone Z1 in FIG. 19), are to have density conversions performed thereon so that no hue change occurs in the density conversions. The density conversions will now be described. A white level is determined for image data concerning each pixel, and the density conversions are performed using the determined white level; no hue change occurs (hue constant) by the density conversions. Such a "hue constant" conversion may be achieved by making a ratio between u* and v* (in the L*u*v* color space used as a uniform color space) be constant during performance thereon of such a conversion. In general, conversion from 3 stimulus values X, Y and Z (in an XYZ color space, each value of X, Y and Z varies linearly with respect to the human eye's sense for respective colors) into L* u* and v* may be expressed by the following equations:

$$L^* = 16\sqrt{(Y/Y0)};$$

$$u^* = 13L^*(u^p - u0); \text{ and}$$

$$v^* = 13L^*(v^p - v0);$$

where $$u^p = 4X/(X + 15Y + 3Z), \text{ and}$$

$$v^p = 9X/(X + 15Y + 3Z);$$

where Y0, u0 and v0 comprise predetermined constants.

In general, if a ratio of reflectance among r, g, and b is maintained constant, a ratio of stimulus values among X, Y and Z is maintained constant; if a ratio among X, Y and Z is maintained constant, values of $u^p$ and $v^p$ are maintained constant during density conversions thereof; If $u^p$ and $v^p$ are maintained constant, both u* and v* are in proportion to a value of L* a ratio between u* and v* thus being maintained constant. Thus, if a ratio of reflectance among r, g and b is maintained constant, a corresponding hue is maintained constant.

Conversions from reflectance values into density values may be achieved by log conversions. That is, a density value D is obtained using a reflectance value d as follows:

$$D = -\log(d).$$

Thus, a desired density value $D^p$ may be obtained by the following equations, where $d^p = sd$ ("s" comprising an arbitrary real number):

$$\begin{aligned} D^p &= -\log(d^p) \\ &= -\log(sd) \\ &= -\log(s) - \log(d) \\ &= D - \log(s). \end{aligned}$$

That is, a multiplication operation in a color space in which variables are linear to corresponding reflectance values corresponds to a subtracting operation in a color space in which variables are linear to corresponding density values.

Thus, such a conversion with hue remaining constant may be achieved by subtracting such a log(s) value from respective color component values r, g and b.

How such a log(s) value may be determined will now be described. Such subtraction operation as mentioned above, which operation may be executed so as to obtain such a desired density value $D^p$, is executed using the log(s) value. Such a subtraction operation is to be performed for each pixel using a corresponding log(s) value (this subtraction value will be termed as "Sub" hereinafter) and the respective Sub may be obtained using a white level obtained for image data values concerning the respective pixel. The respective white level may comprise, for example, a max(r, g, b) such as mentioned above.

Figure 21:
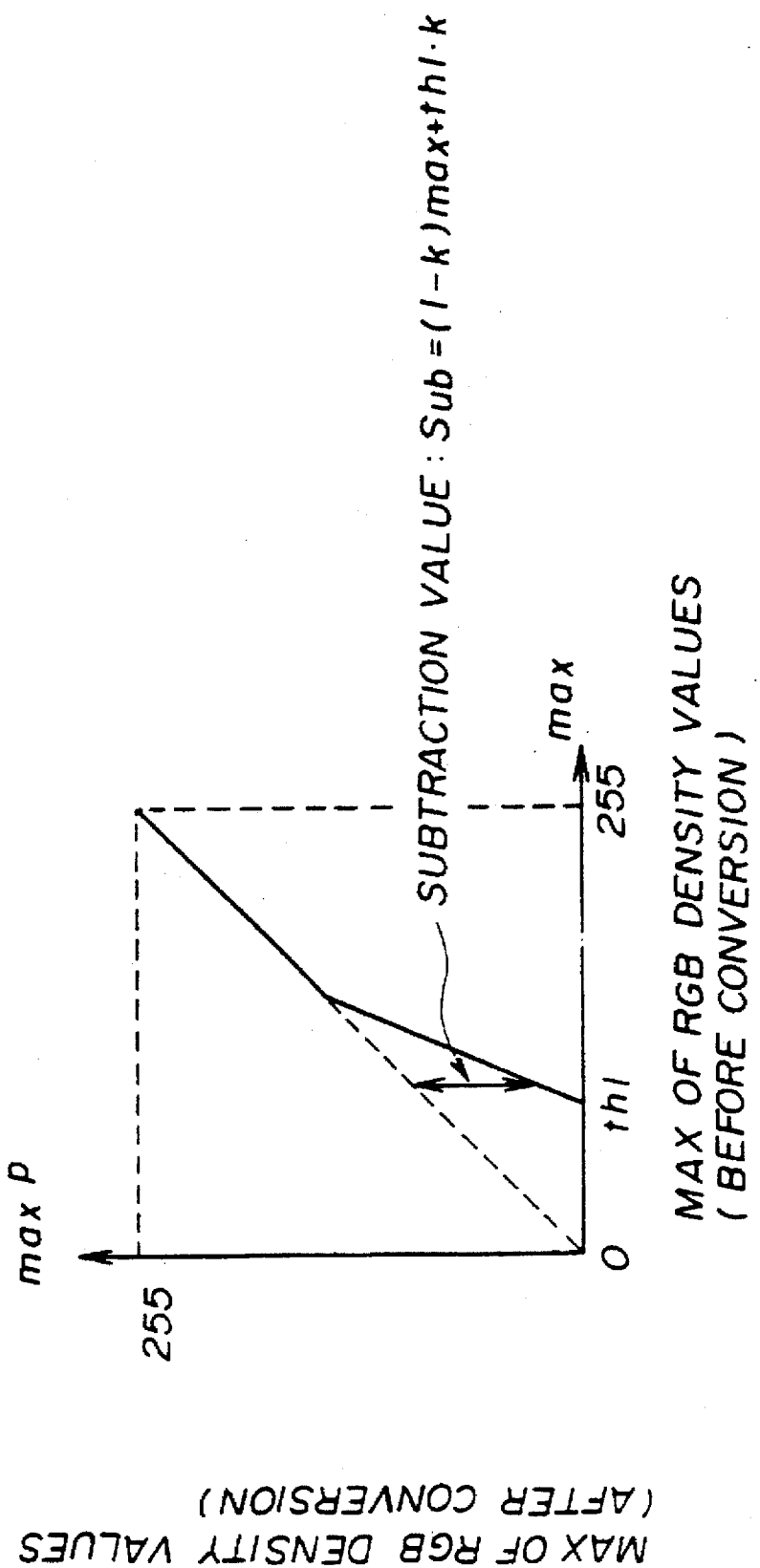
FIG. 21 shows a graph of a density conversion function according to the ninth embodiment of the present invention, in which function a subtraction value is determined using the maximum density level from among density levels of R, G, B.

Such subtraction values (Sub) will now be described with reference to FIG. 21. In FIG. 21, the subtraction values (Sub) are obtained using the maximum values among r, g, and b components of image data. FIG. 21 shows a relation between "max" and "$max^p$". In FIG. 21, the scale of the horizontal axis corresponds to the maximum values "max" among r, g and b before the image data has undergone density conversions according to the ninth embodiment of the present invention. Further, in FIG. 21, the scale of the vertical axis corresponds to the maximum values "$max^p$" among r, g and b after the corresponding image data has undergone density conversions according to the ninth embodiment of the present invention. The subtraction value "Sub" shown in FIG. 21 corresponds to a result of the subtraction operation $max^p$-max, for each max value. In FIG. 21, Sub=0 when max=0, and Sub=th1 when max=th1. In FIG. 21, the larger the value "max" is, in excess of the predetermined value th1, the smaller the value "Sub" becomes, the value "Sub" finally reaching "0". In the example of FIG. 21 the value $max^p$ is caused to approach the value max in the condition max>th1, and with the condition that the rate of this approaching is linear to the increasing rate of the value max. However, various manners, for approaching of the value $max^p$ toward the value max, may be used in the ninth embodiment of the present invention, the various manners corresponding to relations between the value max and the value $max^p$ instead of the manner shown in FIG. 21, the manner of FIG. 21 comprising a manner for approaching the $max^p$ toward the max linearly.

In the example of FIG. 21, the Sub may be obtained by the following equations:

where a slope of a function concerning the above approaching is expressed by "k";

$$\begin{aligned} Sub &= max - (max - th1) \cdot k \\ &= (1 - k) \cdot max + th1 \cdot k. \end{aligned}$$

But if Sub<0 as a result of the above calculation, then Sub is set to 0.

Further, the minimum value "min" is obtained from among the respective color component density values r, g and b. Sub=min if Sub>min, by using the obtained min.

In the above equations, the values th1.k and 1-k are respectively constants. Thus, the values have to be determined once prior to commencement of the background noise removing process. Predetermining of the value k as certain values including 1.23, 1.5 and 2.0 enables replacement of the above multiplication operations by corresponding shift operations.

A block diagram of the background noise removing unit according to the ninth embodiment of the present invention is formed based on the above mentioned principle. An input signal input through the scanner is gamma-converted in density linear characteristics. Then pixel values (r, g, b) are obtained. The pixel values (r, g, b) are then input to a minimum value unit 42 and a maximum value unit 41. The minimum value unit 42 extracts the minimum value from among the pixel values (r, g, b), while the maximum value unit 41 extracts the maximum value from among the pixel values (r, g, b). Then, the extracted maximum value and a predetermined value th1 are compared with each other by means of a comparator 44. Then, the comparator 44 causes each of selectors 46, 46, and 46 to output a respective pixel value "0" as a respective one of the output pixel values ($r^p$, $g^p$, $b^p$) if the result of the comparison is that the maximum value is smaller than the value th1. Further, a subtraction value calculation unit 43 calculates a subtraction value using the maximum value. Then, a comparator 45 compares the calculated subtraction values with the minimum value. A selector 47 then selects the minimum value if (the subtraction value)>(the minimum value), and selects the subtraction value unless (the subtraction value)>(the minimum value). Then, each of subtracters 48, 48 and 48 subtracts the selected value, that is, either the subtract value or the minimum value, from a respective one of the input pixel values (r, g, b) which input pixel values comprise the same values as those input into the minimum value unit 42 and the maximum value unit 41. Each of the subtraction results are then input into a respective one of the selectors 46, 46, and 46. Thus, each of the selectors 46, 46 and 46 outputs (0, 0, 0) as the output pixel values ($r^p$, $g^p$, $b^p$) for the input pixel values (r, g, b) by which input values the corresponding pixel has been determined to be a white pixel or an approximately white pixel through comparison by means of the comparator 44. The comparator 44 causes each of the selectors 46, 46 and 46 to output a respective one of the results of the subtractions by the subtracters 48, 48 and 48 unless the result of the comparison by means of the comparator 44 is that the maximum value is smaller than the value th1.

By the above mentioned background noise removing method according to the ninth embodiment of the present invention, the following advantage may be obtained. It is possible that a relatively high density part of the read image undergoes the background noise removing process, that is, a process of changing the corresponding pixel values to (0, 0, 0) if the corresponding pixel is determined as a white pixel or an approximately white pixel. This background noise removing process being performed on the relatively high density part may be achieved by the threshold value th1 in FIG. 21 being predetermined so as to be relatively large value. This performing of background noise removing process even on relatively high density parts in the image may result in broader background noise removing effect in the duplicate or the reproduced image. In the ninth embodiment of the present invention a boundary between the background-noise-removing-process-performed part in the image and the remaining part of the image does not result in appearance of the above mentioned apparent-border-line on the boundary thereof, even though the background noise removing process is performed on the relatively high density part. Thus, the ninth embodiment may reduce image quality degradation, which degradation may occur in the related art resulting from the background noise removing process.

Figure 22:
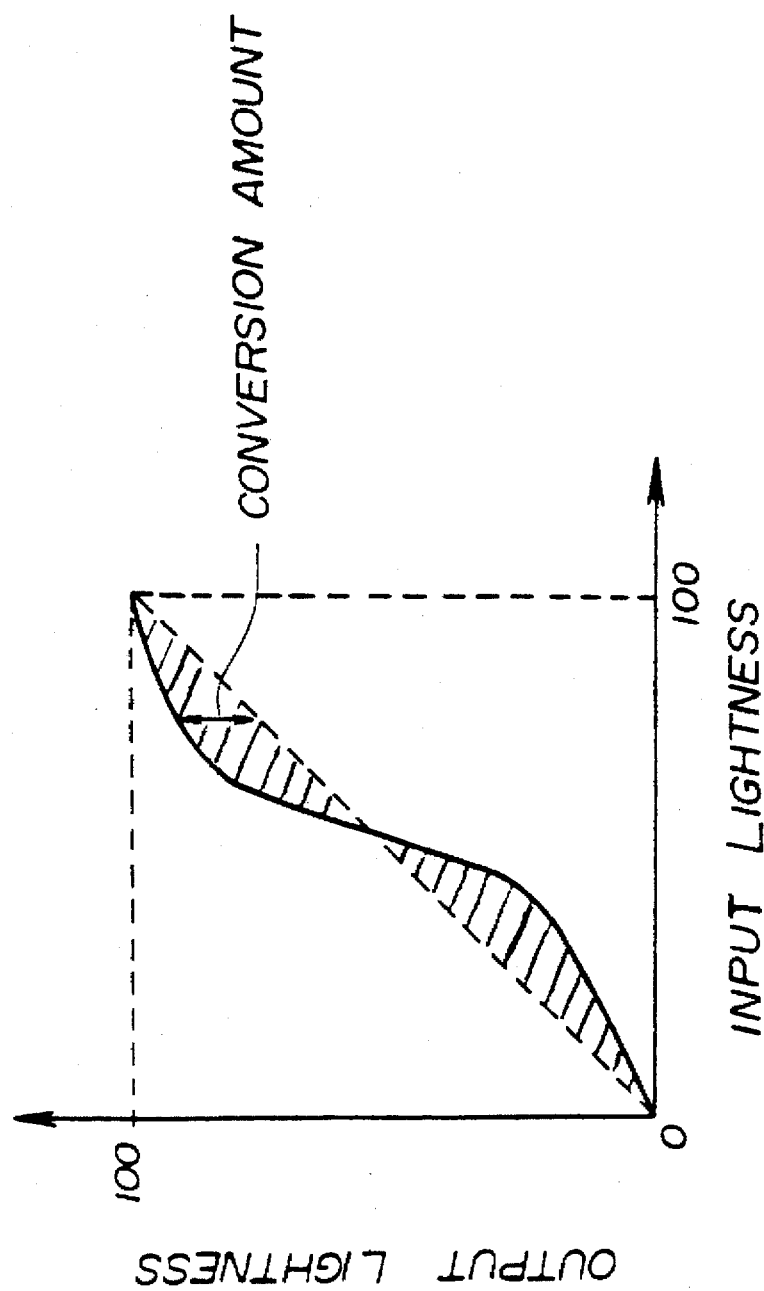
FIG. 22 shows a graph of a density correcting function according to the ninth embodiment of the present invention.

The technology of the above mentioned density conversion method according to the ninth embodiment of the present invention may be utilized for a process other than such a background noise removing process, the hue of the image being maintained during the density conversions by this method This other process comprises, for example, a tone correction process, as shown in FIG. 22, the tone correction process including a function for adjusting tones in an entire image. FIG. 22 shows one example of a function of this tone correction process. In the tone correction of FIG. 22, a part (the left part in FIG. 22) of the image, which part has a relatively low lightness, is caused to become darker while a part (the right part in FIG. 22) of the image, which part has a relatively high lightness, is caused to become lighter. In the related art, such a tone correction process is performed on each color component of image data independently from other color components of the image data, similarly to a background noise removing process in the related art. That is, conversion amounts shown in FIG. 22 are determined for each color component of the image independently from the other color components of the image. Each respective conversion amount shows the differential between (or the relation between) each input amount and the corresponding respective output amount. Thus, in this related art, the tone correction process may cause undesirable hue change and such hue change may result in degradation of the duplicate or reproduced image. The above utilization of the technology of the ninth embodiment of the present invention may prevent such degradation of the duplicate or reproduced image. This is because as described above concerning the ninth embodiment, the lightness conversion amounts are determined for each pixel using the maximum value max (r, g, b), that is, the maximum value of respective pixel image data among concerning color components r, g and b of lightness, which max (r, g, b) being similar to the max (r, g, b) in darkness or reflectance used in the ninth embodiment or the other embodiments. Then, a respective one of the determined lightness conversion amounts is added or subtracted from each of the r, g, and b lightness color components for each input pixel. Thus, the tone correction without hue change may be achieved.

[TENTH EMBODIMENT]

In the above embodiments of the present invention, determination as to whether or not image data corresponds to white or approximately white areas is executed for each pixel. Performing such a background removing process on image comprising characters (letters) having relatively low contrast to the background may cause the following problem. Each of such low contrast characters may have a low density part adjacent to the outline of the character. Such a low density part of the character may be removed by the background noise removing process as a result of being determined to be white or approximately white. This results in making the characters become more light ones and thus results in degrading character image quality a great deal.

A tenth embodiment of the present invention may prevent such character image quality degradation of characters having low contrast, the prevention may being achieved by adding a process, to the above mentioned background noise removing process, the process comprising that a certain part of an image may be prevented from being determined to be a background part.

Figure 23B:
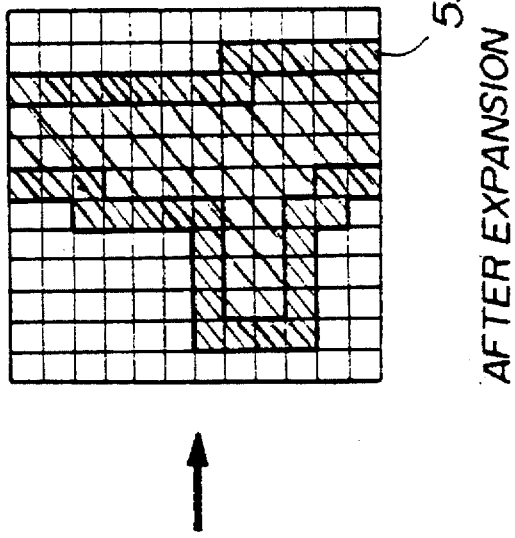
FIGS. 23A and 23B show images before performing an expansion process and after performing the expansion process in accordance with a tenth embodiment of the present invention.
Figure 23A:
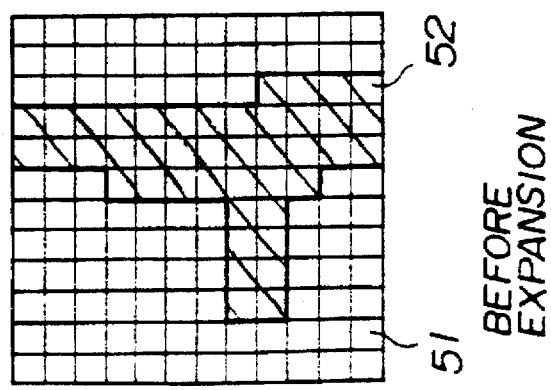

The tenth embodiment of the present invention will now be described with reference to FIGS. 23A and 23B. In the description, the tenth embodiment is described as made by modifying the above seventh embodiment of the present invention. However, the technology of the tenth embodiment may be further used for building embodiments comprising modifying other of the foregoing embodiments of the present invention, similarly to the following. When an object pixel in an image undergoes the background noise removing process, a group of pixels comprising m rows and n columns of pixels, a center pixel of the group of pixels comprising the object pixel, a determination is made whether or not the pixels belong to white or approximately white areas, similarly to the process in the seventh embodiment. The group of pixels of m rows and n columns may comprise, for example, 3 rows and 3 columns of pixels, the group of pixels comprising 9 pixels in the example. In FIG. 23A, pixels 51 (white squares) comprise pixels determined to be part of the background and pixels 52 (relatively low density hatched squares) comprise pixels determined to be non-background pixels. The determination as to whether the pixels comprise background or non-background pixels is performed in accordance with the results of the determination as to whether or not the pixels correspond to white or approximately white areas, similarly to the process in the seventh embodiment.

Then, the expansion process is executed as follows. If a determined non-white-or-approximately-white pixel is included in the group (m rows and n columns) of pixels comprising the object pixel (the object pixel is located in the center of the group of pixels), the object pixel is then determined not to be a white-or-approximately-white pixel, that is, a non-background pixel. Unless the determined non-white-or-approximately-white pixel is included in the group (m rows and n columns) of pixels concerning the object pixel, the object pixel is then determined to be a white-or-approximately-white pixel, that is, a background pixel. Such a determination is performed on each pixel included in the image (12 rows and 12 columns, thus total 144 pixels) of FIG. 23A. Pixels 53 (relatively high density hatched squares) in FIG. 23B show pixels which have been changed from background pixels (pixels determined to correspond to the background area) to non-background pixels (pixels determined not to correspond the background area) as a result of the above expansion process. That is, the expansion of the non-background pixels has been performed by expanding the area (,in the example of FIGS. 23A and 23B, both sides of the area) of non-background pixels by a width of one pixel 5S. Then, after the expansion process is completed, the background noise removing process is performed on each pixel of FIG. 23B, the background noise removing process being executed in accordance with the results of the performed expansion process for the pixels.

Thus, in the tenth embodiment, characters in an image may be prevented from becoming more light even though these characters comprise relatively low contrast characters, thus a high quality character image may be obtained.

Further, the present invention is not limited to the above described embodiments, and variations and modifications may be made without departing from the scope of the present invention.

What is claimed is:

1. A background noise removing apparatus for removing background noise from color image data represented as pixels, each pixel having a plurality of color components, and each color component having a respective density, the apparatus comprising a density converting means including:

means for determining whether or not the density of each color component of a pixel corresponds to a white or approximately white area in an input image, the determining means determining the density of each color component based on a single, collective piece of information concerning the densities of all the respective color components of the pixel; and means for converting the density of each color component of said pixel to a lower density only when the determining means determines that the densities for all color components of said pixel correspond to a white or approximately white area in the input image.

2. The background noise removing apparatus according to claim 1, wherein said density converting means converts the densities concerning color components in the color image data for each pixel so as to change the densities concerning respective color components for the pixel into densities corresponding to the color white when all of the densities concerning respective color components for the pixel are lower than a predetermined threshold density value.

3. A background noise removing method for removing background noise from color image data represented as pixels, each pixel having a plurality of color components, and each color component having a respective density, the method comprising:

(a) determining whether or not each one of the densities of a pixel's color components corresponds to a white or approximately white area in an image, the determining relating to each one of the densities being based on information concerning all densities of all the respective color components of the pixel;

(b) converting the density of each color component so that all the densities for the pixel are changed together into lower densities when it is determined in the determining step that the densities correspond to a white or approximately white area of the image; and (c) determining, for each pixel, whether or not the color image data constitutes data corresponding to a white or approximately-white image portion, based on:
1) the minimum reflectance from among the red component reflectance, the green component reflectance and the blue component reflectance of the color image data for the pixel; and
2) the maximum difference in density between the red density, the green density and the blue density of the color image data for the pixel.

4. The background noise removing apparatus according to claim 1, further comprising color space converting means for converting color image data in a first color space into data in a second color space, said first color space based on a red density axis, a green density axis and a blue density axis and said second color space based on axes including a lightness axis and wherein said density converting means converts the color image data in manners determined by using lightness and saturation of the color image data after the color image data has been converted to the color image data in said second color space.

5. The background noise removing apparatus according to claim 1, further comprising:

density distance deriving means for deriving for each pixel a distance in a first color space between a predetermined reference white point and a point corresponding to the color image data of each pixel, said first color space being formed based on a red density axis, a green density axis and a blue density axis, said determining means determining for each pixel whether or not the color image data comprises data of a white or approximately-white image portion, the color image data comprising data of a white or approximately-white image portion being data to be converted by said density converting means, the determination being executed based on the distance derived by said density distance deriving means; and wherein said density converting means converts densities in the color image data in manners determined by using the distance derived by said density distance deriving means.

6. A background noise removing apparatus for removing background noise from color image data represented as pixels, each pixel having a plurality of color components, and each color component having a respective density, the apparatus comprising:

means for determining whether or not each one of the densities of a pixel's color components corresponds to a white or approximately white area in an image, the determining relating to each one of the densities being based on information concerning all densities of all the respective color components of the pixel;

density converting means for converting the density of each color component so that all the densities for the pixel are changed together into lower densities when the determining means determines that the densities correspond to a white or approximately white area in the image;

maximum-density-component detecting means for detecting for each pixel which color component thereof has the maximum density from among a red component, a green component and a blue component of the color image data, said determining means determining, for each pixel, whether or not the color image data constitutes data having densities approximately corresponding to white color, the determination being executed based on the maximum-density component of the color image data for each pixel, the maximum-density color component having been detected by said maximum-density component detecting means;

wherein said density converting means includes means for converting densities for each pixel in the color image data in manners determined by using the maximum density of the color component of the color image data for the pixel, the color component having been detected for the pixel by said maximum-density component detecting means.

7. The background noise removing apparatus according to claim 1, wherein said density converting means converts the densities in the color image data so that the hue corresponding to the original color image data may coincide with the hue corresponding to the converted color image data.

8. The background noise removing apparatus according to claim 7, wherein said density converting means converts densities in the color image data so that the density ratios between the red density component, the green density component and the blue density component of the original color image data may coincide with the density ratios between the red density component, the green density component and the blue color density component of the converted color image data.

9. The background noise removing apparatus according to claim 5, wherein said density converting means includes:

conversion table storing means for storing, for each color component, a conversion table in which is previously written the density resulting from the conversion corresponding to each original density.

10. The background noise removing apparatus according to claim 6, wherein said density converting means includes:

conversion table storing means for storing, for each color component, a conversion table in which is previously written the density resulting from the conversion corresponding to each maximum density to be used for the conversion and corresponding to each density to be converted.

11. A background noise removing apparatus for removing background noise from color image data represented as pixels, each pixel having a plurality of color components, and each color component having a respective density, the apparatus comprising:

means for determining whether or not each one of the densities of a pixel's color components corresponds to a white or approximately white area in an image, the determining relating to each one of the densities being based on information concerning all densities of all the respective color components of the pixel;

density converting means for converting the density of each color component so that all the densities for the pixel are changed together into lower densities when the determining means determines that the densities correspond to a white or approximately white area in the image, said determining means determining, for each pixel, whether or not the color image data thereof constitutes data of a white or approximately-white image portion, the color image data including data of a white or approximately-white image portion being data to be converted by said density converting means, the determination being executed based on:

1) the maximum density from among the red density, the green density and the blue color density of the color image data for the pixel; and 2) the maximum difference in density between densities of the red density, the green density and the blue color density of the color image data for the pixel.

12. A background noise removing apparatus for removing background noise from color image data represented as pixels, each pixel having a plurality of color components, and each color component having a respective density, the apparatus comprising:

means for determining whether or not each one of the densities of a pixel's color components corresponds to a white or approximately white area in an image, the determining relating to each one of the densities being based on information concerning all densities of all the respective color components of the pixel;

density converting means for converting the density of each color component so that all the densities for the pixel are changed together into lower densities when the determining means determines that the densities correspond to a white or approximately white area in the image, said determining means determining, for each pixel, whether or not the color image data thereof constitutes data of a white or approximately-white image portion, the determination for each pixel being executed based on the minimum reflectance among the red component reflectance, the green component reflectance and the blue component reflectance of the color image data for the pixel.

13. A background noise removing apparatus for removing background noise from color image data represented as pixels, each pixel having a plurality of color components, and each color component having a respective density, the apparatus comprising:

means for determining whether or not each one of the densities of a pixel's color components corresponds to a white or approximately white area in an image, the determining relating to each one of the densities being based on information concerning all densities of all the respective color components of the pixel; and density converting means for converting the density of each color component so that all the densities for the pixel are changed together into lower densities when the determining means determines that the densities correspond to a white or approximately white area in the image, said determining means determining, for each pixel, whether or not the color image data constitutes data thereof constitutes data of a white or approximately-white image portion, the determination for each pixel being executed based on:

1) the minimum reflectance from among the red component reflectance, the green component reflectance and the blue component reflectance of the color image data for the pixel; and 2) the maximum difference in density between densities among the red density, the green density and the blue color density of the image data for the pixel.

14. The background noise removing apparatus according to claim 7, wherein said density converting means converts densities corresponding to the color image data so that the density ratios between the cyan density component, the magenta density component, the yellow density component and the black of the original color image data may coincide with the density ratios between the cyan density component, the magenta density component, the yellow density component and the black the red density component of the converted color image data.

15. The background noise removing apparatus according to claim 1, said determining means comprising:

a) approximately-white determining means for determining, for each pixel, whether or not the color image data for the pixel corresponds to the white or approximately white density areas of an image, and whether or not the color image data for each pixel being determined as data corresponding to the density corresponds to the color white or approximately white, said approximately-white determining means determining:

1) that densities of the red component, the green component and the blue component of the color image data for the pixel are equal to or less than a predetermined threshold value, and 2) that the color image data for the pixel corresponds to an approximately achromatic color;

wherein said density converting means includes means for converting densities corresponding to color image data for the pixel so as to change the densities into lower densities, the color image data to be converted comprising the color image data for the pixel which has been determined by said approximately-white determining means to be the white or approximately-white density.

16. The background noise removing apparatus according to claim 15, wherein said density converting means includes:

means for converting the densities corresponding to the color image data into densities corresponding to the white density.

17. The background noise removing apparatus of claim 1, further comprising:

excluding means for excluding color image data of a pixel from among the color image data for the pixels to be converted, wherein the color image data for the pixel to be excluded has color image data corresponding to a pixel having an adjacent pixel located within a predetermined area from the pixel having color image data to be excluded, the color image data for the adjacent pixel not having densities corresponding to the white or approximately white color.

18. A background noise removing method for removing background noise from color image data represented as pixels, each pixel having a plurality of color components, and each color component having a respective density, the method comprising the steps of:

determining whether or not the density of each color component of a pixel corresponds to a white or approximately white area in an image, the determining being performed for the density of each color component based on a single piece of collective information concerning the densities of all the respective color components of the pixel; and converting the density of each color component of said pixel to a lower density only when it is determined in the determining step that the densities for all color components of said pixel correspond to a white or approximately white area of the image.

19. The background noise removing method according to claim 18, wherein:

said determining step determines whether or not all of the densities concerning respective color components for the pixel are lower than a predetermined threshold density value, and said density converting step converts the densities concerning color components in the color image data for each pixel so as to change the densities concerning respective color components for the pixel into densities corresponding to white color when said determining step determines that all of the densities concerning respective color components for the pixel are lower than a predetermined threshold density value.

20. The background noise removing method according to claim 18, wherein said density converting step converts densities in color image data so as to change the densities into lower densities in manners determined by using the original densities respectively, the densities corresponding to the color image data to be converted comprising those of a white or approximately-white image portion.

21. The background noise removing method according to claim 18, further comprising a color space converting step for converting color image data of a first color space into color image data of a second color space, said first color space being formed based on a red density axis, a green density axis and a blue density axis and said second color space being formed based on axes including a lightness axis, and wherein said density converting step converts densities in the color image data in manners determined by using lightness and saturation of the color image data after the color image data has been converted into that according to said second color space.

22. The background noise removing method according to claim 18, further comprising:

a density distance deriving step for deriving for each pixel a distance, in a first color space, between a predetermined reference white point and a point corresponding to the color image data of each pixel, said first color space being formed based on a red density axis, a green density axis and a blue density axis, said determining step determining for each pixel whether or not the color image data comprises data of a white or approximately-white image portion, the color image data of a white or approximately-white image portion being data to be converted by said density converting step, the determination being executed based on the distance derived by said density distance deriving step; and wherein said density converting step converts densities in the color image data in manners determined by using the distance derived by said density distance deriving step.

23. A background noise removing method for removing background noise from color image data represented as pixels, each pixel having a plurality of color components, and each color component having a respective density, the method comprising:

(a) determining whether or not each one of the densities of a pixel's color components corresponds to a white or approximately white area in an image, the determining relating to each one of the densities being based on information concerning all densities of all the respective color components of the pixel;

(b) converting the density of each color component so that all the densities for the pixel are changed together into lower densities when it is determined in the determining step that the densities correspond to a white or approximately white area of the image;

(c) detecting, for each pixel, a color component having the maximum density from among a red component, a green component and a blue component of the color image data; and (d) determining, for each pixel, whether or not the color image data constitutes data corresponding to approximately white color densities, the determination being executed based on the maximum density color component of the color image data for the pixel, the maximum density color component having been detected for the pixel in said maximum-density-component detecting step (c);

wherein said density converting step (b) includes converting densities for each pixel in the color image data in manners determined by using the maximum density color component of the color image data for each pixel, the maximum density color component having been detected for the pixel in said maximum-density-component detecting step (c).

24. The background noise removing method according to claim 18, wherein said density converting step (b) converts the densities in the color image data so that the hue of the original color image data coincides with the hue of the converted color image data.

25. The background noise removing method according to claim 24, wherein said density converting step (b) converts densities in the color image data so that the density ratios between the red density component, the green density component and the blue density component of the original color image data coincide with the density ratios between the red density component, the green density component and the blue density component of the converted color image data.

26. The background noise removing method according to claim 22, wherein said density converting step includes: the step of storing, for each color component, a conversion table in which is previously written the density resulting from the conversion corresponding to each original density.

27. The background noise removing method according to claim 23, wherein said density converting step includes: the step of storing, for each color component, a conversion table in which is previously written the density resulting from the conversion corresponding to the maximum density to be used for the conversion and corresponding to each density to be converted.

28. A background noise removing method for removing background noise from color image data represented as pixels, each pixel having a plurality of color components, and each color component having a respective density, the method comprising:

(a) determining whether or not each one of the densities of a pixel's color components corresponds to a white or approximately white area in an image, the determining relating to each one of the densities being based on information concerning all densities of all the respective color components of the pixel;

(b) converting the density of each color component so that all the densities for the pixel are changed together into lower densities when it is determined in the determining step that the densities correspond to a white or approximately white area of the image; and (c) determining, for each pixel, whether or not the color image data constitutes data of a white or approximately-white image portion, the color image data including data of a white or approximately-white image portion being data to be converted by said density converting step (b), the determination being executed based on:

1) the maximum density from among the red density, the green density and the blue color density of the color image data for each pixel; and 2) the maximum difference in density between densities of the red density, the green density and the blue density of the color image data for the pixel.

29. A background noise removing method for removing background noise from color image data represented as pixels, each pixel having a plurality of color components, and each color component having a respective density, the method comprising:

(a) determining whether or not each one of the densities of a pixel's color components corresponds to a white or approximately white area in an image, the determining relating to each one of the densities being based on information concerning all densities of all the respective color components of the pixel;

(b) converting the density of each color component so that all the densities for the pixel are changed together into lower densities when it is determined in the determining step that the densities correspond to a white or approximately white area of the image; and (c) determining, for each pixel, whether or not the color image data constitutes data corresponding to a white or approximately-white image portion, the determination for each pixel being executed based on the minimum reflectance among the red component reflectance, the green component reflectance and the blue component reflectance of the color image data for the pixel.

30. The background noise removing method of claim 18, further comprising: the step of excluding color-image data from among the color-image data for the pixels to be converted, wherein the color-image data for the pixel to be excluded has color-image data of a pixel having an adjacent pixel located within a predetermined area from the pixel corresponding to the color-image data to be excluded, which adjacent the white or approximately-white density when two conditions have been fulfilled, the two conditions comprising:

1) that densities for the red component, the green